United States Patent
Keates et al.

(10) Patent No.: US 10,629,963 B2
(45) Date of Patent: Apr. 21, 2020

(54) BATTERY CELL HAVING A DETECTION INTERFACE

(71) Applicant: Intel Corporation, Santa Clara, CA (US)

(72) Inventors: Andrew Keates, Los Gatos, CA (US); Naoki Matsumura, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 14/757,916

(22) Filed: Dec. 24, 2015

(65) Prior Publication Data

US 2017/0187078 A1 Jun. 29, 2017

(51) Int. Cl.
*H01M 10/0525* (2010.01)
*H01M 10/48* (2006.01)
(Continued)

(52) U.S. Cl.
CPC .......... *H01M 10/48* (2013.01); *H01M 2/30* (2013.01); *H01M 2/34* (2013.01); *H01M 2/348* (2013.01); *H01M 4/382* (2013.01); *H01M 4/483* (2013.01); *H01M 10/0422* (2013.01); *H01M 10/052* (2013.01); *H01M 10/0525* (2013.01); *H01M 10/0587* (2013.01); *H01M 10/425* (2013.01); *H01M 2/022* (2013.01); *H01M 2/1686* (2013.01); *H01M 10/4235* (2013.01); *H01M 10/4257* (2013.01); *H01M 2010/4271* (2013.01); *H01M 2010/4278* (2013.01); *H01M 2200/103* (2013.01); *H01M 2220/30* (2013.01); *Y02T 10/7011* (2013.01)

(58) Field of Classification Search
CPC .................................................. H01M 10/4257
See application file for complete search history.

(56) References Cited

U.S. PATENT DOCUMENTS 5,789,101 A * 8/1998 Wheeler ............. H01M 2/1055
429/123
6,897,634 B2 * 5/2005 Ramsden ............. H02J 7/0045
320/111

(Continued)

OTHER PUBLICATIONS

Wu et al., Improving battery safety by early detection of internal shorting with bifunctional separator, Nature Communications, Published Date: Oct. 13, 2014, DOI: 10.1038, Macmillan Publishers, USA, 6 pages.

(Continued)

*Primary Examiner* — Jeremiah R Smith
(74) *Attorney, Agent, or Firm* — International IP Law Group, P.L.L.C.

(57) ABSTRACT

A system and method for a battery cell having an anode and a cathode, and a separator disposed between the anode and the cathode. A conductive layer disposed in the separator facilitates detection of dendrite growth from the anode into the separator, the detection correlative with a reduction in voltage between the anode and the conductive layer. A detection interface component coupled to the conductive layer is configured to facilitate routing of a signal from the conductive layer to a circuit external to the battery cell, the signal indicative of the detection. The battery cell may be part of a battery or battery pack which may be utilized by an electronic device.

11 Claims, 14 Drawing Sheets

(51) Int. Cl.
*H01M 2/34* (2006.01)
*H01M 10/04* (2006.01)
*H01M 10/0587* (2010.01)
*H01M 4/48* (2010.01)
*H01M 10/052* (2010.01)
*H01M 2/30* (2006.01)
*H01M 4/38* (2006.01)
*H01M 10/42* (2006.01)
*H01M 2/16* (2006.01)
*H01M 2/02* (2006.01)

(56) References Cited

U.S. PATENT DOCUMENTS

| | | | | |
|---|---|---|---|---|
| 7,846,571 | B2* | 12/2010 | Christensen | H01M 6/5005 429/61 |
| 2006/0275656 | A1* | 12/2006 | Feddrix | H01M 2/1055 429/179 |
| 2008/0003503 | A1* | 1/2008 | Kawakami | H01G 9/155 429/231.5 |
| 2009/0208834 | A1* | 8/2009 | Ramasubramanian | H01M 4/13 429/149 |
| 2011/0177398 | A1 | 7/2011 | Affinito et al. | |
| 2012/0021297 | A1 | 1/2012 | Hauser et al. | |
| 2013/0224632 | A1 | 8/2013 | Roumi | |
| 2014/0272500 | A1* | 9/2014 | Roumi | G01R 31/3627 429/90 |
| 2014/0329120 | A1* | 11/2014 | Cui | H01M 10/48 429/90 |
| 2014/0377670 | A1 | 12/2014 | Khiterer et al. | |
| 2015/0004450 | A1 | 1/2015 | Matsumura | |
| 2015/0017398 | A1 | 1/2015 | Saito et al. | |
| 2015/0140379 | A1* | 5/2015 | Yau | H01M 10/48 429/90 |
| 2015/0171398 | A1* | 6/2015 | Roumi | H01M 2/1673 429/7 |
| 2016/0006081 | A1* | 1/2016 | Eaglesham | H01M 4/58 429/50 |

OTHER PUBLICATIONS

PCT International Search Report, PCT Application No. PCT/US2016/059030, dated Jan. 17, 2017, 4 pages.

* cited by examiner

100

300

600

700

800

910

1000

BATTERY CELL HAVING A DETECTION INTERFACE

TECHNICAL FIELD

The present techniques relate generally to batteries, and more particularly, to a battery cell having a detection interface component.

BACKGROUND ART

An electric battery may convert stored chemical energy into electrical energy. The battery or battery cell may have a positive terminal, or cathode, and a negative terminal, or anode. The terminal marked positive may be at a higher electrical potential energy than the terminal marked negative. When a battery is connected to an external circuit, electrolytes are able to move as ions within, allowing the chemical reactions to be completed at the separate terminals and so deliver energy to the external circuit.

Single-use or "disposable" batteries are typically used once and discarded. The electrode materials are generally irreversibly changed during discharge. Rechargeable batteries can typically be discharged and recharged multiple times. The original composition of the electrodes can be restored by reverse current. Examples of rechargeable batteries include lead-acid batteries used in vehicles and lithium-ion batteries used in electric or hybrid vehicles, portable electronics, and other uses. Batteries come in many shapes and sizes, from miniature cells used to power hearing aids and wristwatches to battery banks the size of rooms that provide standby power for telephone exchanges and computer data centers. Higher energy densities of a battery may be generally desirable, as such may lead to a smaller size or foot print of the battery. Indeed, a higher energy density may provide for smaller batteries providing the same energy as larger batteries. Such can improve efficiency, reduce costs, improve user experience, and make new products more feasible.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
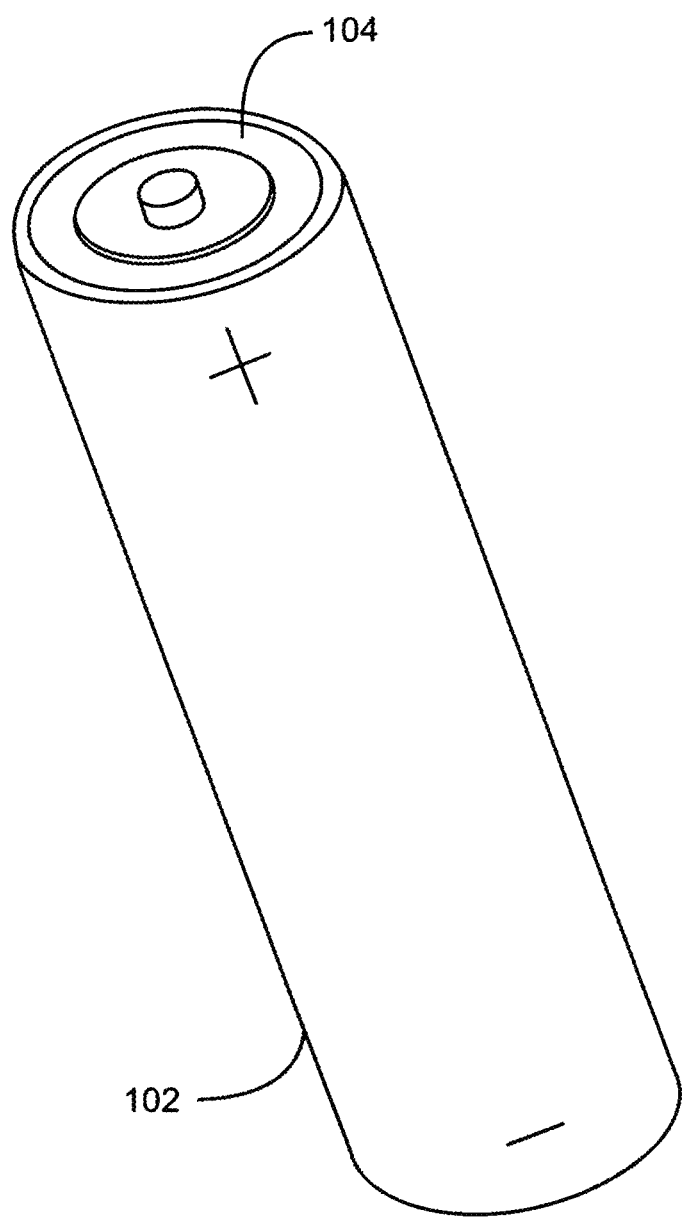
FIG. 1 is a perspective view of a battery in accordance with embodiments of the present techniques.

The present techniques relate generally to a battery cell having a detection interface that facilitates routing of a detection signal out of the battery cell to a circuit external to the battery cell. The detection signal may indicate early detection of dendrite growth in the battery cell before a short circuit (due to dendrite growth) occurs between the anode and cathode of the battery cell. The detection interface may be coupled to a detector in the battery cell (e.g., in a separator of the battery cell) to detect a short circuit between the anode and the conductive layer such as that associated with dendrite growth. The detector or sensor in the separator may be a conductive layer or short-circuit detection electrode. The detection may be before the dendrite growth reaches the cathode which could cause a problematic short circuit between the anode and cathode.

In certain examples, the battery cell may be a lithium-ion cell or lithium-metal cell. In some examples, a lithium-metal cell may employ Li-metal instead of graphite as the anode. Such may beneficially provide for a battery with greater volumetric energy density. Unfortunately, a Li-metal battery may be more prone to internal short circuit due to, for example, dendrite growth on the anode piercing the separator between the anode and the cathode. Thus, monitoring for an internal short circuit, including early detection, may make such applications more feasible. In some examples, a detection interface (e.g., terminal) on the battery (e.g., a cylindrical battery cell) facilitates implementation of a dendrite detection mechanism, improving applicability and use of high-energy density Li-metal cells.

A battery or battery cell (e.g., a lithium-metal battery cell) may have at least two electrodes including a negative electrode or an anode (e.g., lithium metal) and a positive electrode or a cathode (e.g., metal oxide). A separator is disposed between the anode and the cathode to electrically isolate the anode and cathode from each other, while allowing ions to pass through. Examples herein include a conductive layer disposed in the separator and that provides for detection of dendrite growth from the anode into the separator. The detection may be before the dendrite growth from the anode reaches active material of the cathode that might cause a significant short circuit within the battery cell. In other words, the conductive layer in the separator may provide for an early warning of a short circuit between the anode and the cathode.

Indeed, examples provide for routing of a signal of the detection out of the battery cell, so that responsive measures may be implemented. In other words, embodiments provide a detection interface component of the battery cell to route the signal out of the battery cell. The detection interface component may be coupled to the conductive layer such as via an electrical connection or electrical wire connection. In certain embodiments, the detection interface component is a cathode current collector of the battery cell. If so, the detection interface component may have a dual function, i.e., as the cathode current collector and for routing a detection signal or detection current out of the battery cell. On the other hand, the detection interface component is not the cathode current collector but may instead be a third terminal of the battery cell and that is electrically isolated from the cathode and the anode. If so, the detection interface component or third terminal may be dedicated to detection.

In general, a detection layer or detection system may include the separator conductive layer, a detection interface component of the battery cell, and a connection or connection wire coupling the conductive layer to the detection interface component. Thus, embodiments provide for routing of a signal or current indicative of the detection from the conductive layer to circuitry external to the battery cell. The circuitry may be protection circuitry of a battery or battery pack having the battery cell. The circuitry could also include circuitry in an external system such as an electronic device housing and relying on the battery or battery cell for power. The battery-back protection circuitry and/or the external circuitry in the external system or electronic device may automatically respond to the detection and/or alert a user regarding the detection (early warning), and so on.

Therefore, a detection system may be configured, for example via an "intelligent" separator (i.e., having the conductive layer or detection layer), to detect dendrite growth from the anode into the separator in advance of a short circuit realized between the anode and the cathode. In some examples, the detection system includes the conductive layer positioned in the separator, and wherein the detection system detects a short circuit (a closed circuit) between the anode and the conductive layer. As mentioned, a detection interface component of the battery cell may be coupled to the conductive layer. The detection layer including the conductive layer and detection interface component may provide a signal indicative of a short circuit between the anode and the conductive layer, the signal to be processed by external circuitry to (1) implement protection action, (3) alert a user, (3) formulate an additional response, and so on.

High energy density batteries are generally desirable. The use of a lithium metal (instead of graphite in Li-ion battery) in Li-metal battery as the anode may beneficially provide for a battery with greater volumetric energy density. A cylindrical shape may be advantageous for Li-metal batteries due to the pressure applied to keep the L-metal growth on the anode in place. Unfortunately, such a battery (Li-metal battery) may be more prone to internal short circuit due to, for example, dendrite growth on the anode piercing the separator between the anode and the cathode. Thus, while high energy density in cylindrical battery cells may be desirable, monitoring for an internal short circuit may make such applications more feasible. Circuits to monitor battery cell behavior may be implemented in lithium ion (Li-ion) and Lithium-metal (Li-metal) battery systems. In some examples, a detection interface component on the battery (e.g., a cylindrical battery cell) facilitates implementation of a dendrite detection mechanism, improving applicability and use of high-energy density Li-metal cells.

A lithium-ion battery or lithium-metal battery may be single battery cell, or have multiple battery cells. An electrical current may reach the battery or cell through conductive surfaces, terminals, cans, caps, layers, tubes, current collectors, etc. Such may be aluminum (Al) on one side or end of the battery, and copper (CU) on another side or end of the battery. Other metals, such as nickel (Ni), steel, etc., may be involved. A positive electrode (cathode) may be adjacent to one conductive layer such as the Al layer. In examples, the cathode may be coupled to the conductive layer via a tab (e.g., an Al tab). A negative electrode (anode) may be adjacent to the other conductive layer such as the Cu layer. In examples, the anode may be coupled to the conductive layer via a tab (e.g., a Cu tab).

The positive electrode or cathode may be made of a lithium oxide, for example. The negative electrode or anode may be, for example, made of graphite, a form of carbon with a layered structure, or made of silicon or silicon-based materials, and so forth. The lithium-ion battery may include a transport medium such as an electrolyte, so that ions can carry the battery charge. To reduce the possibility of a short circuit, the aforementioned separator may be placed between the two electrodes. The separator is generally permeable to the lithium ions, i.e., the separator may have micro-porosity to allow the passage of an ionically conducting electrolyte, or the separator itself be constructed of an ionically conductive material, and the like. During charging of the battery, the positively-charged lithium ions pass from the cathode through the separator into the anode (e.g., a layered graphite structure) where the lithium ions are stored and the battery becomes charged. When the battery discharges, that is when energy is removed from the battery or cell, lithium ions travel via the electrolyte from the anode through the separator back to the cathode. The electrolyte may be a liquid or gel permeating pores in the separator, or may be a material function of the separator itself, and so on.

FIG. 1 is a battery cell 100. In general, an electric battery or electric battery pack may have one or more battery cells 100 that convert stored chemical energy into electrical energy. Each (electrochemical) battery cell 100 has a negative or anode terminal (e.g., steel can 102) and a positive or cathode terminal (e.g., cap 104). The terminal marked positive is generally at a higher electrical potential energy during discharge than is the terminal marked negative. The terminal (e.g., cathode cap 104) marked positive may be the source of electrons that when connected to an external circuit will flow and deliver energy to an external device. When a battery cell 100 is connected to an external circuit, electrolytes may be able to move as ions within, allowing the chemical reactions to be completed at the separate terminals and so deliver energy to the external circuit. It is the movement of those ions within the battery cell 100 which allows current to flow out of the battery cell 100 to perform work. Although the term battery may mean a device with multiple cells, single cells may also be labeled as a battery.

A lithium-ion battery (sometimes Li-ion battery or LIB) is a member of a family of rechargeable battery types in which lithium ions move from the negative electrode and terminal (e.g., can 102) to the positive electrode and terminal (e.g., top cap 104) during discharge and back when charging. Li-ion batteries may use an intercalated lithium compound as one electrode material, compared to the metallic lithium used in a non-rechargeable lithium battery. The electrolyte, which allows for ionic movement, and the two electrodes may be constituent components of a lithium-ion battery cell.

The electrochemical roles of the electrodes reverse between anode and cathode, depending on the direction of current flow through the cell. Typical commercial implementation of the negative electrode for lithium-ion battery cells include graphite. In certain examples, the electrolyte maybe typically a mixture of organic carbonates such as ethylene carbonate or diethyl carbonate containing complexes of lithium ions. These non-aqueous electrolytes generally use non-coordinating anion salts such as lithium hexafluorophosphate (LiPF6), lithium hexafluoroarsenate monohydrate (LiAsF6), lithium perchlorate (LiClO4), lithium tetrafluoroborate (LiBF4), and lithium triflate (LiCF3SO3), and the like.

As discussed, a detection system may include a conductive layer in the separator, and the conductive layer coupled to a detection interface component of the battery cell to route a detection signal or detection current out of the battery cell. The detection signal or current may be sent to circuitry external to the battery cell, such as protection circuitry of a battery pack and/or circuitry of an electronic device that relies on the battery cell for power. To provide that such a signal can be read from the detection system (e.g., having a conductive layer in the separator), the battery (e.g., a cylindrical battery) may implement various types of detection component interfaces. In one example, the battery cell has an anode cap terminal and a cathode cap terminal, and a can terminal as a third terminal (detection interface component). On the other hand, battery cell may have a cathode cap terminal, an anode can terminal, and with the cathode current collector as the detection interface component coupled to the conductive layer. The detection system including the conductive layer and the detection interface component may have or be coupled to a protection system (e.g., of a battery pack) and may have a fuse electrically coupling the detection electrode and the cathode current collector. The fuse may break or disconnect if a relatively large amount of current flows through the fuse, such as in the event of a significant short circuit between anode, the conducive layer, and the cathode current collector, i.e., due to a dendrite reaching the conductive layer from the anode. However, the disconnection by the fuse may take a few milliseconds, giving time to record (e.g., via the protection circuit of the battery pack and/or via external circuitry in an electronic device relying on the battery) the associated event before power is lost or removed. Other configurations providing for detection interface component or a third terminal are applicable.

Figure 2:
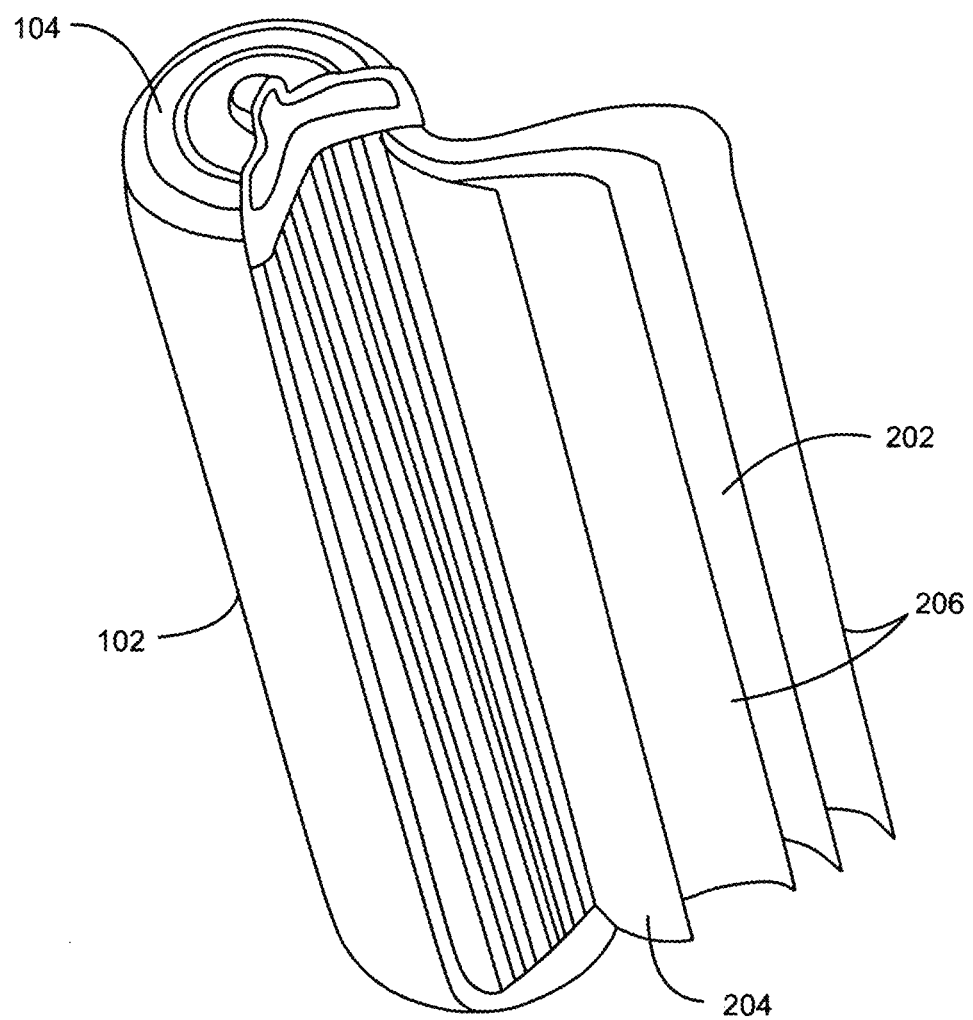
FIG. 2 is a diagram of a cylindrical battery in accordance with embodiments of the present techniques.

FIG. 2 is a cylindrical battery cell 100 (e.g., lithium-ion battery cell) having a steel can 102 (negative terminal) and a cap 104 (positive terminal). In the illustrated embodiment, the can 102 or metal case has therein a relatively long spiral having three thin sheets pressed together: a negative electrode 202 (anode), a positive electrode 204 (cathode), and a separator 206. Inside the case, these sheets may be submerged in an organic solvent (e.g., ether) that acts as the electrolyte. Ether is one common solvent. The separator 206 may be a very thin sheet of micro-perforated plastic. As the name implies, the separator 206 separates the positive electrode 204 and negative electrode 202 while allowing ions to pass through a liquid electrolyte which permeates the pores in the separator in certain examples. The positive electrode 204 made be of lithium cobalt oxide (or LiCoO$_2$), or other lithium oxides or compounds. The negative electrode 202 may be made of carbon, graphite, silicon, and so on. When the battery charges, ions of lithium move through the electrolyte from the positive electrode 204 to the negative electrode 202 and attach to the carbon (graphite) or silicon. During discharge, the lithium ions move back to the positive electrode 204 (e.g., LiCoO$_2$) from the carbon. The movement of these lithium ions may occur so that each cell produces an average potential difference between the electrodes of 3.7 volts, for example. This voltage may be higher than the 1.5 volts typical of a normal AA alkaline cell, for instance.

Again, a separator is disposed between the anode and the cathode to electrically isolate the anode and cathode from each other, while allowing ions to pass through with the separator being permeable to ions (e.g., lithium ions). The separator may be constructed of an ionically conductive film, or as a porous insulator, facilitating the flow of an ionically-conductive electrolyte through the pores. As mentioned, a conductive layer may be position in the separator to provide for detection of dendrite growth from the anode into the separator, and thus the conductive layer facilitates indication of an early warning of a potential piercing by a dendrite of the separator from the anode to active material of the cathode. However, routing of a signal or current representative of the detection out of the battery cell may be problematic. Cylindrical battery cells which have only two standard terminals do not have a modified terminal or a third terminal for detecting internal short circuits arising in lithium-ion or Li-metal battery cells. Without modification, such may make problematic employing leading-edge high energy densities due to risks of thermal excesses associated with internal short circuits during usage, and the associated lack of early detection of internal short circuits.

Figure 3:
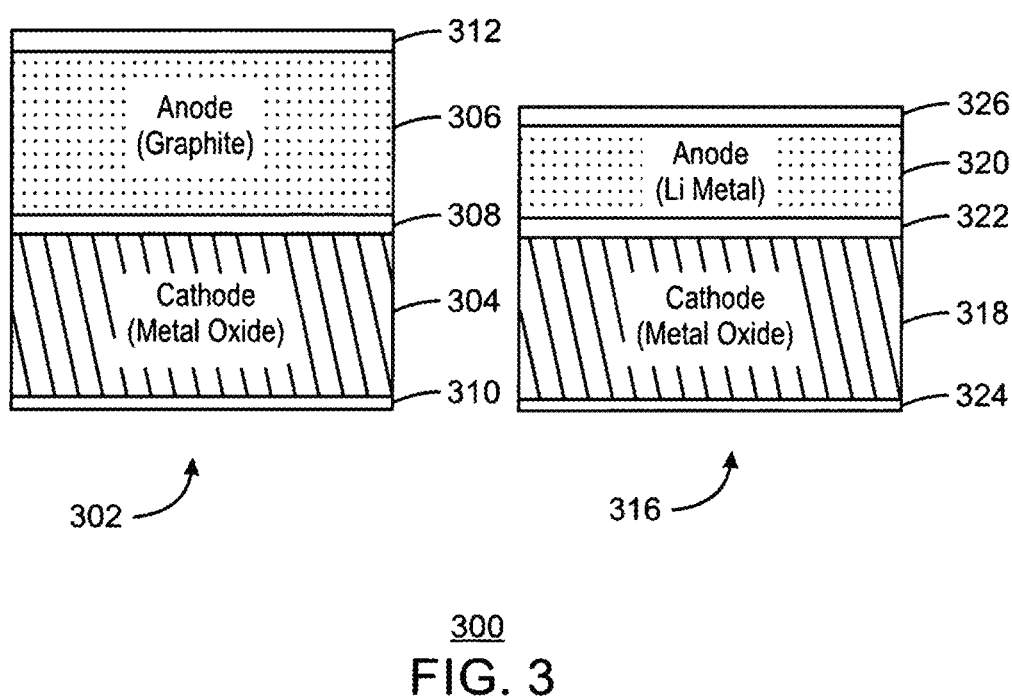
FIG. 3 is a diagrammatical representation of two batteries including a lithium-ion battery and a lithium-metal battery in accordance with embodiments of the present techniques.

FIG. 3 is a representation of two batteries 300 which are a lithium-ion battery 302 and a lithium-metal battery 316. The first battery is a lithium-ion battery 302 having a cathode 304 (metal oxide) and an anode 306 (graphite) separated by a separator 308. The lithium-ion battery 302 has a positive terminal 310 and a negative terminal 312. The second battery is a lithium-metal (Li-metal) battery 316 having a cathode 318 (metal oxide) and an anode 320 (lithium metal or Li-metal) separated by a separator 322. The Li-metal battery 316 has a positive terminal 324 and a negative terminal 326.

In certain examples, battery energy density may be increased if Li-ion batteries utilize a Li-metal anode (instead of a carbon or graphite anode), such as depicted with the Li-ion battery 316. In this case, instead of using a graphitic material to store incoming ions during battery charging, the ions form a very thin layer of Li-metal, e.g., on an underlying thin metal foil (e.g., copper sheet) or layer (e.g., 10 microns) of the anode. It should be noted that metals other than Lithium may be employed, such as magnesium (Mg+).

By removing the carbon layer, the battery 316 becomes thinner and the energy stored per unit of battery volume increases. Such batteries 316 may benefit from increased pressure applied to the battery cell layers to keep the Li-metal particles that form during battery charging physically and electrically connected to each other and to the anode current collector. Cylindrical batteries or cells may advantageously hold the pressure beneficial to hold the Li-particles in place, as a thin layer on or forming the Li-metal anode 320. Unfortunately, with Li-metal battery or battery cells, the Li-metal layer may not form as a uniform sheet. Instead, the growing Li-metal layer may form spikes with pierce the separator 322 and therefore may ultimately short the anode 320 to the cathode 318, i.e., an internal short circuit that may lead to an undesired thermal reaction in the battery cell.

Figure 4:
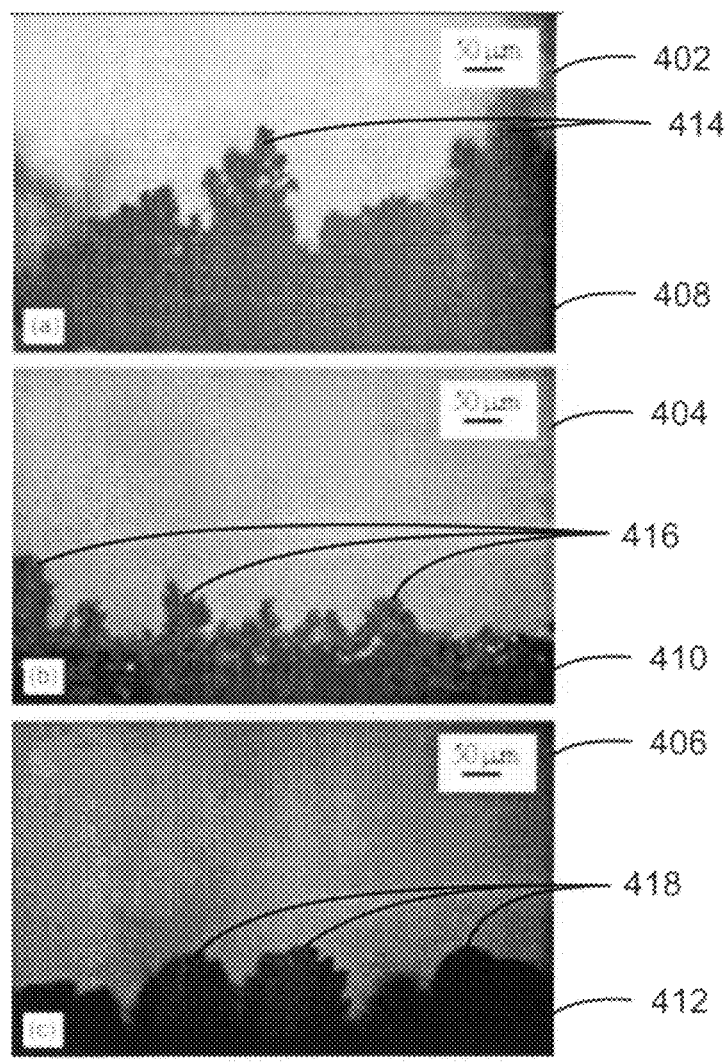
FIG. 4 shows micrographs of three images of a lithium-metal thin layer formed on a Li-metal battery cell anode in accordance with embodiments of the present techniques.

FIG. 4 is micrographs 400 including three images 402, 404, and 406 each depicting a lithium-metal thin layer 408, 410, and 412, respectively, formed on a Li-metal battery cell anode. Each lithium-metal thin layer 408, 410, 412 forms non-uniform, as illustrated by respective peaks (spikes) or dendrites 414, 416, 418. The dendrite growth can lead to piercing of the separator layer disposed between the cathode and anode, leading to a short circuit in the battery or battery cell.

In some examples, the battery (e.g., a cylindrical cell) may only have two terminals, e.g., positive terminal and negative terminal. Embodiments of the present techniques may be directed to detecting the presence of dendrites inside battery cells. Examples may further address routing signals or indications from the detection mechanism to (1) protection circuitry of the battery or battery pack, and (2) further to outside of the battery, such as to an electronic device utilizing the battery. Other aspects addressed may be informing the user of a dendrite growth or an internal short circuit, retiring the battery or battery cell in response to detection of an internal short-circuit, and so on.

The detection inside the battery cell (e.g., see FIG. 5) may be monitored via various techniques. One example (see FIG. 6) is a battery cell type having a cap at both ends of a tube, rather than a cap at one end of an extruded metal can. The additional cap facilitates routing of an additional signal (e.g., via a third terminal) out of the battery, i.e. from a detection mechanism. The detection may be a conductive layer, detection layer, detector, detection electrode, etc. Another example technique (see FIG. 7) is for the detection mechanism to be connected (e.g., directly) to the cathode current collector internal to the battery cell, creating an indirect detection of an internal short circuit generally without the need for a third battery terminal as depicted in FIG. 6. With such detection mechanisms (e.g., FIG. 5) and the routing (e.g., FIG. 6 or 7) of indication signals from the detection mechanisms, external circuits may react to unusual behavior of the battery cell, such as when the battery cell is charging. Embodiments may extract information from a detection mechanism in a battery cylindrical cell.

Figure 5:
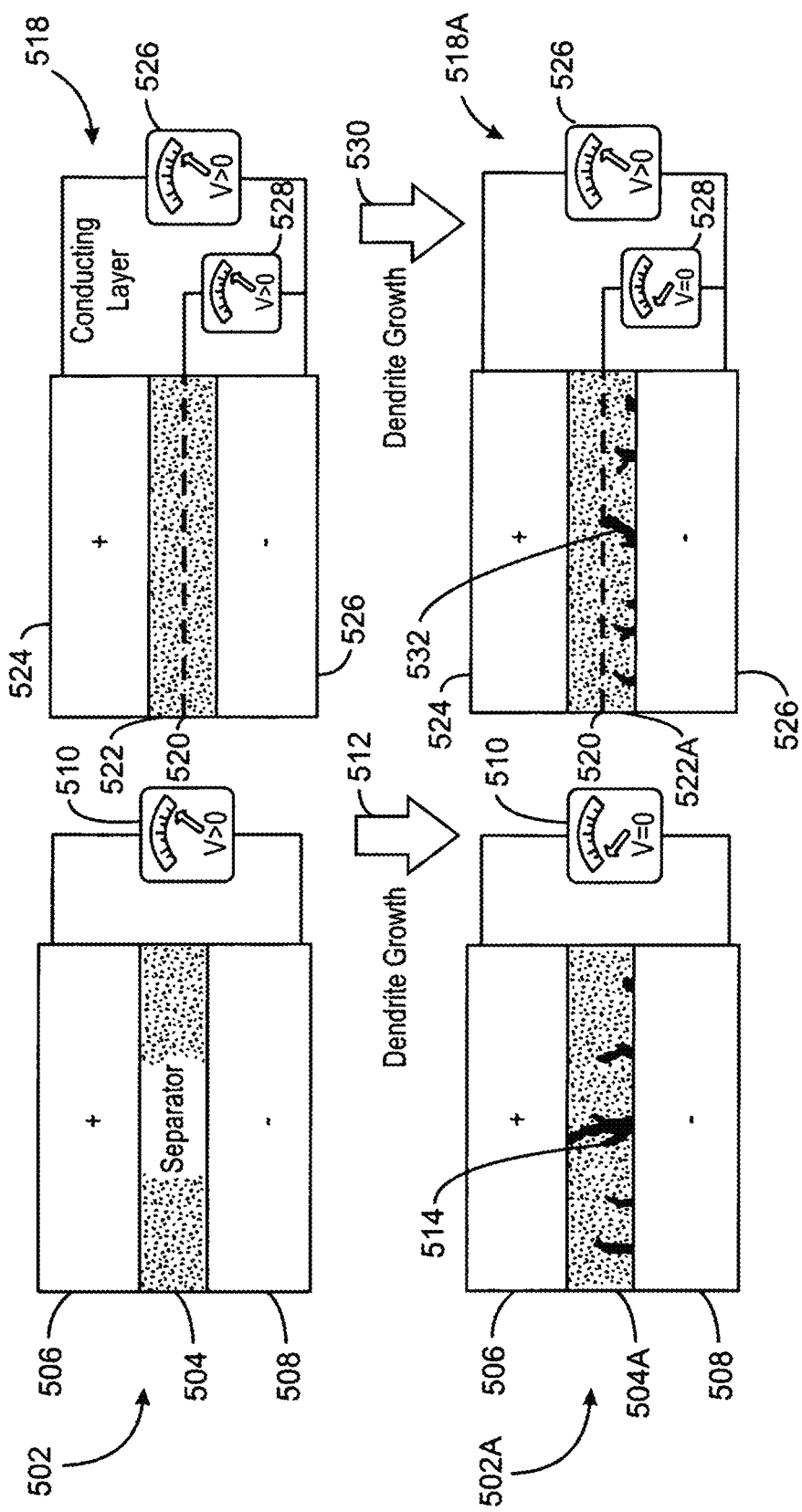
FIG. 5 is a diagrammatical representation of two systems for dendrite detection in a battery or battery cell in accordance with embodiments of the present techniques.
Figure 6:
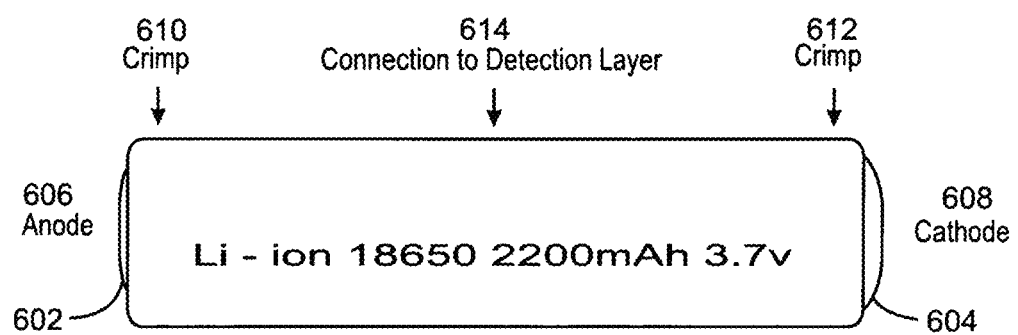
FIG. 6 is a diagram of a battery cylindrical cell manufactured, not via an open can, but via a tube in accordance with embodiments of the present techniques.

FIG. 5 is two systems 500 including a first system 502 and a second system 518, each system representing a battery having an anode, a cathode, and a separator. The reference numerals 502A and 518A indicate the first system 502 and the second system 518, respectively, later in time so to depict dendrite growth.

In the illustrated example, the first system 502 does not have a conductive layer for detection in the separator 504. In contrast, the second system 518 has a conductive layer 520 for detection in the separator 522. Thus, the second system 518 provides for a detection mechanism including the conductive layer 520 and which facilitates dendrite detection in a battery or battery cell, such as into the separator 522. The first system 502 may be characterized as having a detection system that detects dendrite growth through (piercing) the separator 504 to the cathode including active material of the cathode. Of course, such piercing could cause a significant internal short circuit.

The first system 502 includes the separator 504 disposed between a cathode 506 and an anode 508 of the battery. A voltmeter 510 measures the voltage across the separator 504, or the voltage difference between the cathode 506 and the anode 508. Over time, as indicated by arrow 512, dendrite 514 growth on the anode 508 occurs into and through the separator 504. A dendrite 514 pierces the separator 504, resulting in a short circuit, as indicated by the voltage going from positive (greater than zero) in the system 502 to zero in the system 502A. Such a fault detection may be useful in cases where the dendrite acts as a fuse and burns out as current passes through it. Though if so, this fault may be recognized as a short-lived drop in battery voltage. A more substantial dendrite that does not burn out may cause catastrophic failure and not exhibit a "fuse effect". Therefore, detections or warnings may be beneficial before the short circuit between the anode 508 and the cathode 506 occurs, i.e., before the dendrite 514 fully pierces through the separator 504 to the anode 508.

The second system 518 is similar to the first system 502. However, in the second system 518, a conducting layer 520 is positioned in the separator 522. As with the first system 502, the separator 522 of the second system 518 is disposed between the cathode 524 and the anode 526 of the battery cell. The voltmeter 526 is disposed to measure voltage across the separator 522. An additional voltmeter 528 is disposed to measure the voltage between the conducting layer 520 and the anode 526. The presence of the conducting layer 520 may provide for early detection of dendrite growth over time (arrow 530) into the separator 522.

In other words, the system 518A may detect a dendrite 532 reaching the conductive layer 522. Therefore, significant dendrite growth can be detected (e.g., as a warning) before a short circuit between the cathode 524 and anode 526 is experienced. In the illustrated embodiment, the voltmeter 528 measuring voltage between the conductive layer 520 and the anode 526 changes from an indication of a positive or non-zero voltage to an indication of a low voltage (including zero or near zero) with the dendrite 532 reaching the conductive layer 520 in the separator 522A. The other voltmeter 526 remains indicating a voltage and thus signifying that a short circuit between the cathode 524 and anode 526 has not occurred (has yet to occur), i.e., the dendrite 532 has not yet reached the cathode 524.

Therefore, with the conductive layer 522 (or similar detection mechanism) of the second system 518, dendrite 532 growth may be detected prior to an internal short circuit between the cathode 524 and the anode 526. In response, the detection may be acted upon by (1) protection circuitry in an associated battery pack, (2) automatically by an electronic device employing the battery having the second system 518, and/or by a user of the battery or electronic device, and so forth. The position of the conductive layer 520 in the separator 522 may be specified during fabrication of the battery to give the desired timing or relative indication of the warning. For instance, a position of the conductive layer 520 in the separator 522 closer to the anode 526 will give an earlier warning than a position further from the anode 526. The position of the conductive layer 520 may be chosen to provide for adequate warning while realizing sufficient battery life including with respect to the detection response, and the like.

Thus, examples may extract information from a detection mechanism having a conductive layer in the separator of a cylindrical battery or cell. In other words, a conductive layer embedded in a battery separator layer may be employed to detect the arrival of a dendrite into the separator. The detection mechanism having the conductive layer may include or be characterized as a detection layer, a detector, a detection terminal, a modified terminal, a third terminal, a detection electrode, a third electrode, and the like. On the left of the diagram of FIG. 5, with the first system 502A, a dendrite 514 is growing and creating a problematic short circuit with the cathode 506. On the right, with the second system 518A, a detection layer (conductive layer 520) embedded in the separator 522A detects the dendrite 532 when the dendrite 532 reaches the conductive layer 520 before the dendrite 532 gets to the cathode 524 active material. Therefore, in examples with the second system 518, the battery may be retired more efficiently, typically including cessation of charging the battery, for instance. The implementations of the second system 518 in FIG. 5 may be labeled as smart separators for battery care or battery protection. However, some cylindrical cells do not have a third terminal to connect to a conducting detection layer.

FIG. 6 is an exemplary battery cylindrical cell 600 that has a third terminal (e.g., as a detection interface component of the cell 600) to couple the conducting detection layer or a conductive layer to external circuitry. The third terminal is employed to route a signal from the detection layer (e.g., conductive layer 520) out of the battery cell to a protection circuitry in a battery pack and/or to circuitry external to the battery pack in an electronic device housing the battery pack. In such a configuration, the conductive layer in the separator and the third terminal may be characterized as a detection layer, a third electrode, or a detection electrode, and the like, of the battery cell. The conductive layer and the third terminal, and optionally along with other additional components, may be characterized as a detection system. Moreover, again, the third terminal in the illustrated embodiment may be labeled as a detection interface component of the battery cell 600.

To provide for the detection interface component or third terminal, the battery cylindrical cell 600 may be manufactured, not via an open can, but as a tube or with a tube casing. A cap 602, 604 is applied at both ends instead of one end only, facilitating a third terminal to exist as illustrated in the example of FIG. 6. Thus, a unique structure of cylindrical cell 600 is implemented. Typically, a cap may be applied at the anode but a can is employed for the cathode 608 for conventional battery. However, in the illustrated embodiment, a cap 602 is applied via a crimp 610 at the anode 606 terminal, and a second cap 604 is applied via a second crimp 612 at the cathode 608 terminal. The crimps may be applied over respective ridges in manufacturing of the battery cell, and with an installed insulating gasket electrically isolating the caps 602 and 604 from the tube. Thus, the tube, i.e., body or casing of the battery, may be employed as a third terminal or detection interface component, as referenced by arrow 614. This third terminal (detection interface component) may provide for connection to and output from an internal detector layer such as the systems described with respect to FIG. 5 and other detection mechanisms and systems. As an alternative, one of the caps 602 and 604 may be used as the detection terminal or detection interface component, and the tube or casing used as an anode or cathode. In general, the cell 600 has a third terminal as a detection interface component to be used for detection.

Therefore, detection (e.g., see FIG. 5) inside the battery cell 600 may be monitored via the third terminal with the implementation noted in FIG. 6. Again, the battery cell 600 type is constructed having a cap 602, 604 at both ends of a tube, rather than a cap at one end of an extruded metal can. The additional cap 604 facilitates routing an additional signal out of the battery 600, i.e. from a detection mechanism (e.g., of FIG. 5) via the tube or third terminal of the battery cell 600. With such detection mechanisms and the routing of indication signals (via 614) from the detection mechanisms, external circuits may react to unusual behavior of the battery 600, including when the battery cell is charging, for instance. As mentioned, the specific assignment of the functions of the two caps and the tube may vary. Indeed, each of these three terminals may perform the function of anode, cathode, or detection layer terminal, depending on how specified in fabrication. Any of the functions anode/cathode/detection may be assigned to any of the three terminals cap/can/cap.

As discussed, a lithium ion or lithium metal battery has a negative electrode having an active material which releases lithium ions when discharging and intercalates or absorbs lithium ions when the battery is being charged. The positive electrode of a lithium ion battery has an active material capable of reacting with lithium ions on discharge, and releasing lithium ions on charging the battery. The electrodes are usually equipped with some means to collect the charge generated by the battery during discharge, and to permit connection to an external power source during the recharging of the lithium ion battery. The current collectors may be made of stainless steel, iron-nickel alloys, copper foil, aluminum, and similar metals. Thin current collectors may be thin copper or aluminum foils, for example. In order for the battery to have an acceptable capacity, the active material is generally a thicker layer. In contrast, a current collector, such as a cathode current collector, generally does not have active material and but instead employed to provide a conducting path.

Figure 7:
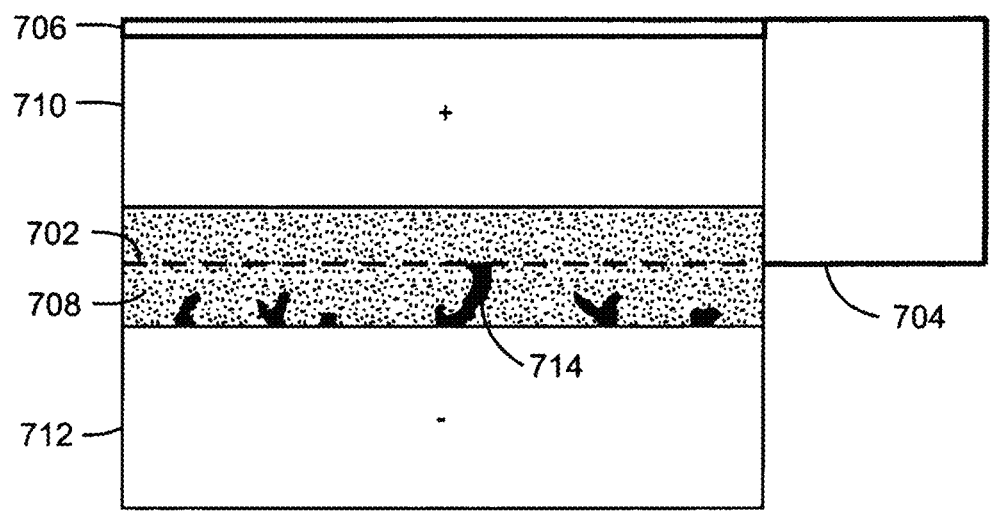
FIG. 7 is a diagram of battery or battery cell in which the cathode current collector receives a signal from a separator conductive layer in accordance with embodiments of the present techniques.

FIG. 7 is a battery or battery cell 700 in which the cathode current collector 706 as a detection interface component and which receives a signal on a connection 704 from the conductive layer 702 of the separator 708. The separator 708 is disposed between the cathode 710 and the anode 712 of the battery cell 700. The cathode 710 includes the active material of the cathode 710, whereas the cathode current collector generally does not include the typical active material of the cathode 710.

In examples, a standard cell casing is used in which the anode 712 and the battery 700 case are all a single drawn steel or aluminum form with a single crimped cap (not shown) for the cathode 710 connection. In the casing, the cathode current collector 706 is connected (e.g., directly) to the detection mechanism or layer 702 inside the battery cell. As discussed below, a fuse (e.g., fuse 1002 of FIG. 10) may be installed between the conductive layer and the cathode current collector 706. The detection layer, detection mechanism, or detection system, etc., may include the conductive layer 702, the connection or line (e.g., a metal connection wire) to the current collector 706, an associated voltmeter (not shown), and other components, and share the cathode current collector 706 with the cathode 710. Thus, the cathode current collector 706 in this example has at least a dual-function: (1) as part of the cathode 710 and (2) as detection interface component or detection terminal. As for operation in examples, the signal 702 may originate from a voltmeter associated with the conductive layer 702. The voltmeter may measure voltage between the conductive layer 702 and the anode 712. As indicated in the discussion of FIG. 5, the voltage measured by the voltmeter would generally go to zero (or to a low voltage, transient voltage, etc.) as the dendrite 714 reaches the conductive layer 702. Thus, a signal via connection 704 and the cathode current collector 706 (detection interface component in this example) may indicate a warning of dendrite 714 growth into the separator 708.

The voltage reduction with a short circuit between the anode 712 and conductive layer 702 may not be as great as a voltage reduction with a short circuit between the anode 712 and the active material of the cathode 710. Also, the voltage reduction and current increase with a short circuit between the anode 712 and cathode current collector 706 may not be as great as with a short circuit between the anode 712 and the active material of the cathode 710.

Therefore, FIG. 7 illustrates a detection structure which can be used in a 2-terminal battery cell, e.g., as an alternative to the example of FIG. 6. In examples with FIG. 7, the detection layer or conductive layer 702 is connected to the cathode current collector 706 inside the battery, bypassing the active material layer of the cathode 710. If a dendrite reaches the detection conductive layer 702, the conductive path or connection 704 (e.g., a connection wire) serves at least two functions. Firstly, the connection 704 may create a highly conductive path likely to "blow the fuse" as the dendrite 714 shorts to the anode current collector. Secondly, implementation of the connection 704 avoids the current flowing through the active material of the cathode 710. The event of a transitory high-current passing through connection 704 may be utilized as a signal to indicate that dendrites exist, as this current represents a partial shorting between anode and cathode, which may result in a transitory drop in voltage across the two battery terminals.

The signal on connection 704 and associated indication may be routed via the cathode collector 706 to a protection circuit and external circuitry for processing of and response to the indication. Thus, the cathode collector 706 is treated as a third terminal though not a third terminal but instead actually part of the cathode. As for external circuitry, the external circuitry may be, for example, in an electronic device employing or housing the battery 700. Therefore, in the example of FIG. 7, the detection layer may be connected (e.g., directly) to the cathode current collector 706 internal to the battery cell 700. With such detection mechanisms and the routing of indication signals 704 from the detection mechanisms, external circuits may react to unusual behavior of the battery cell 700, including when the battery cell is charging, for instance.

Thus, certain embodiments may uniquely employ the cathode current collector 706 as a dual-purpose terminal, as both the current collector and a means to detect an internal short. As discussed, embodiments may connect the cathode current collector 706 directly to the detection layer inside the battery cell 700, for instance, as generally depicted in FIG. 7. In certain configurations, if a short circuit is caused by the dendrites 714, the current path from the cathode current collector 706 to the detection layer may cause a direct short to the dendrites 714 sufficient that the voltage drop caused at the cathode 710 can be measured and detected by an external circuit (not shown). Since the short generally does not involve the active material of the cathode 710, the short may be relatively benign compared to a short circuit that causes current to flow through the cathode 710 active material to the anode 712. In examples, dendrites 712 form during the battery 700 charging process and typically not on discharge of the battery 700. Battery 700 charging can be stopped and the battery cell retired, discharging one last time, in response to detection (of a dendrite reaching the conductive layer 702. The detection may be made via the detection mechanism/layer (having the conductive layer 702) and external circuitry.

Embodiments may also address retiring the battery or battery cell when an internal short circuit is detected. Various examples may be implemented to retire the battery and/or take other actions in response to detection of a short circuit. Some of these examples are discussed below with respect to FIGS. 8-10. Moreover, as discussed, lithium-ion battery or lithium metal battery may refer to a battery where the negative electrode (anode) and positive electrode (cathode) materials serve as a host for the lithium ion (Li+). Lithium ions move from the anode to the cathode during discharge and are intercalated into (e.g., inserted into voids in the crystallographic structure of) the cathode. The ions reverse direction during charging. The structure of the cathode capable of intercalated of the ions may be labeled as the active material of the cathode. Again, a cathode current collector generally does not have this active material.

Figure 8:
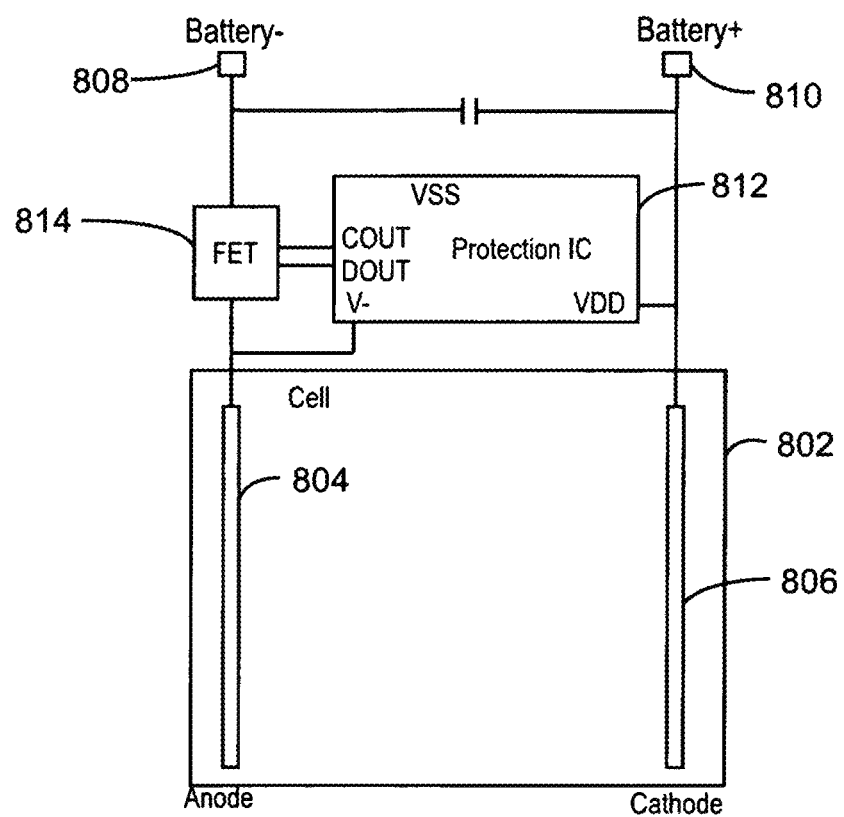
FIG. 8 is a diagram of a battery pack circuit, and a battery cell having two terminals.

FIG. 8 is a battery pack circuit 800. A battery cell 802 has an electrode (anode) 804 and an electrode (cathode) 806. The battery has negative (anode) terminal 808 and positive (cathode) terminal 810. When a low battery voltage is detected by the VDD (voltage drain drain) input of the protection integrated circuit (IC) 812, a field-effect transistor (FET) 814 may open to stop charge or discharge of the battery. Thus, if a short circuit occurs between the anode 804 and cathode 806, the FET 814 opens to stop the charge or discharge of the battery. However, such a short circuit may result in an excessive thermal reaction. Therefore, as indicated with respect to FIG. 9, an early detection layer may be added to the battery, such as similarly discussed with respect to FIG. 5.

Figure 9:
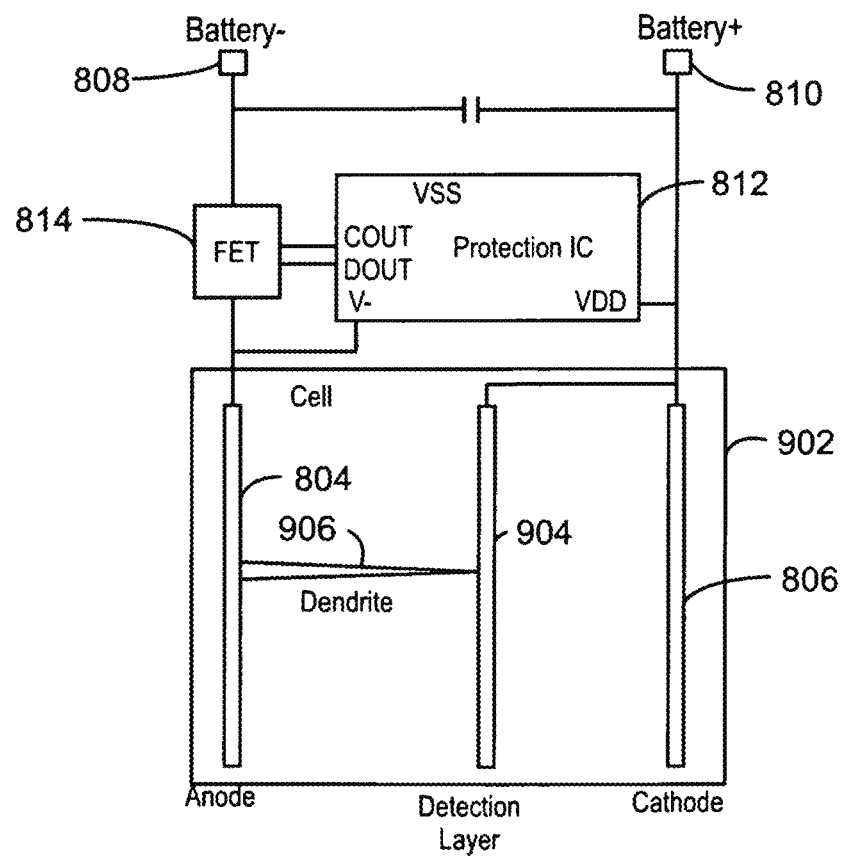
FIG. 9 is a diagram of a battery pack circuit and a battery cell having two terminals and a conductive layer in a separator in accordance with embodiments of the present techniques.

FIG. 9 is a battery pack circuit 900 and battery cell 902 having a conductive layer 904 electrically connected internally to the cathode current collector of the cathode 806. The conductive layer 904 may be positioned in a separator between the anode 804 and the cathode 806. The conductive layer 904 may facilitate detection of growth of a dendrite 906 before the dendrite 906 fully pierces the separator between the anode 804 and the cathode 806, i.e., before the dendrite 906 growth results in an internal short circuit between the anode 804 and cathode 806. The conductive layer 904 may be coupled to the cathode current collector 706 (see., e.g., FIG. 7) via a direct connection, wired connection, fuse connection (see, e.g., FIG. 10), and so on. In the illustrated embodiment, the cathode current collector 706 may function as a cathode current collector, and also be a detection interface component of the cell 902 that facilitates routing of a detection signal or current out of the cell 902 to the protection IC 812. The conductive layer 904 may provide for detection of an internal short-circuit occurring between the anode 804 and the conductive layer 904. Upon the detection of this typically less-problematic internal short circuit (as compared to an overall internal short circuit between the anode 804 and cathode 806 active material), the FET 814 via the protection IC 812 may open.

However, if a Li-metal battery (e.g., of the battery pack circuit) with a detection layer having a conductive layer 904 connected with a cathode current collector 906 inside the cell 902, an internal short may occur with current and ions flowing between cathode 806 and anode 804, although the VDD of the protection IC 812 detects low voltage and opens the FET 814. Another issue is that the external system (e.g., electronic device utilizing the battery) may shutdown (loss of power) because of low voltage due to the internal short circuit, and that a user may not be aware of what in particular happened. The user may perceive incorrectly such a shutdown as an overall failure of the electronic device. Yet, because this phenomenon most likely may occur during charge, an external power source may be present, but removing that source (for example, moving the product away from a wireless charging station) may cause a system crash (electronic device shutdown or failure) if the battery is no longer operational. The examples discussed below with respect to FIG. 10 including installation of a fuse may address some of these issues.

Figure 9A:
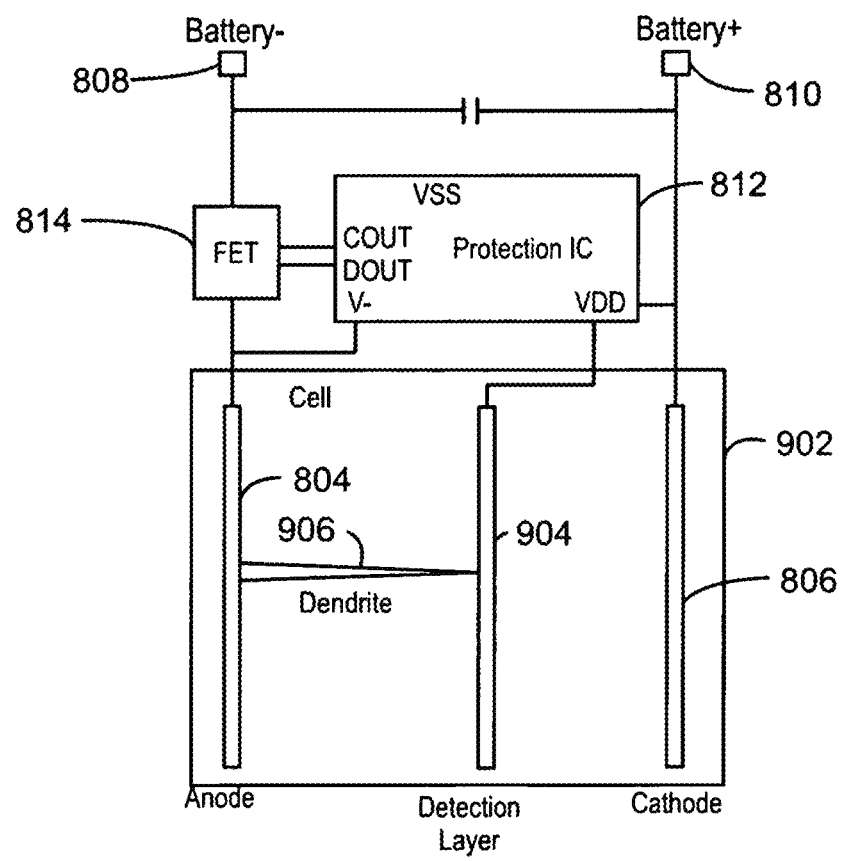
FIG. 9A is a diagram of a battery pack circuit, and battery cell having three terminals and a conductive layer in a separator in accordance with embodiments of the present techniques.

FIG. 9A is a battery pack circuit 910 and cell 902 utilizing a cell third terminal (instead of the cathode current collector)

as the detection interface component of the cell 902. Thus, the cell 902 has three terminals electrically isolated with respect to each other. For instance, the examples with respect to FIG. 6 may be utilized to implement battery pack circuit 910 and the cell 902 of FIG. 9A. A signal or current from the conductive layer 904 is routed out of the cell 902 to the protection IC 812 via a third terminal. Again, the third terminal is electrically isolated from the other two terminals 808 and 810. Similarly, in this example, the conductive layer 904 may be an electrode (e.g., a short-circuit detection electrode) that is electrically isolated from the anode 804 and cathode 806.

When a dendrite growing from the anode 804 reaches the conductive layer 904 (detection electrode in this example), a short circuit may occur between the anode 804 and the conductive layer 904. The voltage between the anode 804 and conductive layer 904 may decrease to a low voltage, near zero voltage, or zero voltage. The voltage decrease may be measured by the circuitry indicating dendrite growth into the separator. The indication may be via a signal or current via the third terminal from the conductive layer to the protection IC 812. The indications may be an early warning in advance of the dendrite growth reaching the cathode 806 (reaching the active material of the cathode 806) which could be a more significant or problematic short circuit.

Figure 10:
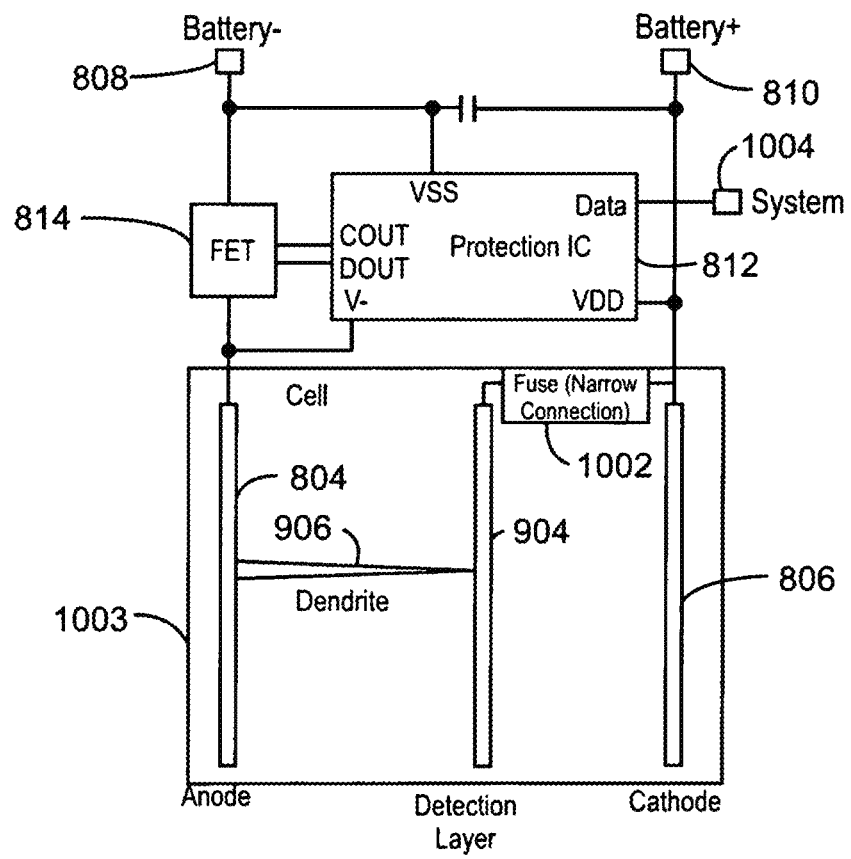
FIG. 10 is a diagram of the a battery pack circuit, and the battery cell of FIG. 9 but having a fuse in accordance with embodiments of the present techniques.

FIG. 10 is a battery pack circuit 1000 and battery cell 1003 similar to the configuration of FIG. 9, but with a fuse 1002 included in the battery cell 1003. The fuse 1002 may be placed between the conductive layer 904 and the cathode current collector of the cathode 806. In a particular example, the fuse 1002 is a narrow and/or thin metal wire so that the fuse 1002 may be disconnecting/molten when a current (e.g., large current) of short circuit flows through the fuse. Other types of fuses 1002 may be employed. The fuse 1002 metal may be electrochemically stable in normal operation of the battery cell 1003, e.g., when the fuse is not subjected to a large current. In a particular example, the fuse 1002 material may be aluminum or aluminum-coated material with a relatively low melting point, for instance.

In the illustrated embodiment of FIG. 10, when a short circuit happens between the anode 804 and the conductive layer 904, the fuse may disconnect the conductive layer 904 and the cathode current collector of the cathode 806. Consequently, with the fuse 1002 so disconnecting, the battery 1003 may provide normal operation voltage to the coupled system 1004 (e.g., external electronic device). Thus, in normal operation, the system 1004 can log indication in memory of the short circuit between anode 804 and conductive layer 904 that occurred. The logged data and the system alerting a user (or reporting an error message) may be based on a transitory voltage change detected at the cathode 806 before the fuse disconnected the conductive layer 904 or detection layer from the cathode 806. The system 1004 may be an electronic device relying on the battery cell 1003 for power (and that may charge the battery cell 1003). The system 1004 may include circuitry external to the battery cell 1003 and battery pack to interface with the detection system and facilitate detection and alerting the user, and other responses.

Furthermore, two or more voltage levels of detection at the VDD may be specified and set. For example, a first level or setting (e.g., level 1) may be for normal low battery voltage detection (e.g. 2.5V). A second level or setting (e.g., level 2) may be for short-circuit detection (e.g. around 0V). When level 2 is detected, the protection IC 812 may record the event in memory. Indeed, the protection circuit IC 812 may have a few milliseconds, for example, before the fuse 1002 disconnects.

When the fuse 1002 disconnects and the battery provides sufficient voltage that boots the system 1004 (e.g., a laptop or smartphone), the system 1004 may read the recorded event in the memory of protection IC 812 and report the event or error, and the reason, to an operating system (OS), for example, of the system 1004. The OS may alert the user. In other examples, an OS is not employed and the event error and alert may be communicated to the user via other features, including during boot or outside of boot, if a boot is applicable. In certain examples, the protection IC 812 may be part of a fuel gauge IC, a power management IC (PMIC), a system on chip (SOC) IC, etc. For instance, aspects of the detection mechanisms and monitoring circuitry could be built into a PMIC. Of course, the protections IC 812 may be included in or a part of a variety of other components and systems than those mentioned. Embodiments may accommodate a connection with a fuse between cathode current collector and the conductive layer. Several shapes of the fuse may be implemented. Various recovery and reporting examples may be employed when internal short circuit is detected. Certain embodiments may provide for relatively high-energy density with Li-metal battery cells.

Figure 11:
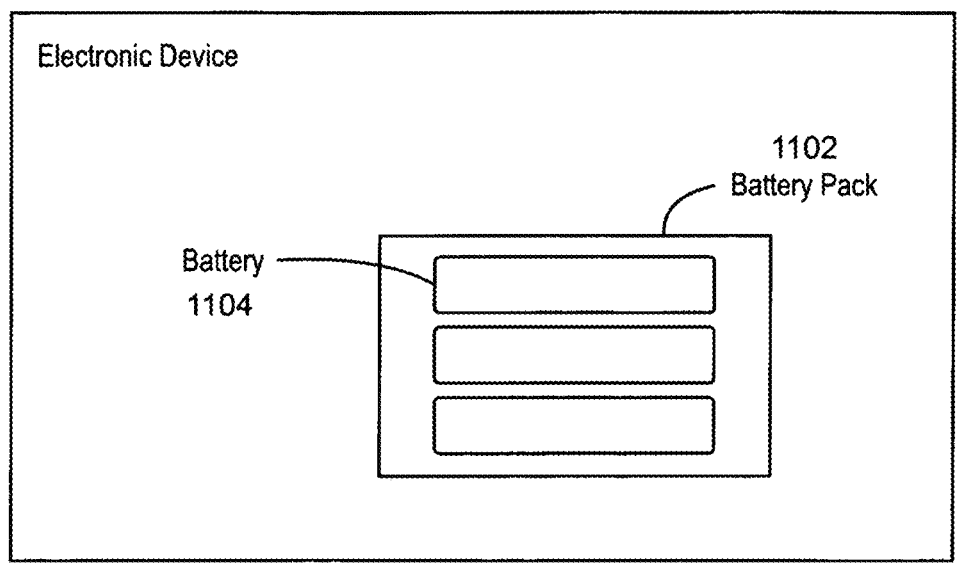
FIG. 11 is a diagram of an electronic device having a battery or battery pack having a battery cell in accordance with embodiments of the present techniques.

FIG. 11 is an electronic device 1100 having a battery pack 1102 with at least one battery (or battery cell) 1104. The electronic device 1100, battery pack 1102, and the battery cell 1104 may have and employ the various battery-related components (e.g., detection system 518, cylindrical cell 600, battery pack circuit 1000, cell 1003, etc.) discussed above. The electronic device 1100 may be a laptop, smartphone, tablet, desktop computer, audio and/or video device, automobile or vehicle, electronic tools, medical devices, and many other electronic devices. The electronic device 1100 may be analogous to the system 1004 of FIG. 10.

A lithium-ion battery (or battery pack) is made from multiple individual cells packaged together with their associated protection electronics. The protection electronics or protection circuitry may include a pack protection printed circuit board (PCB). Moreover, with a Li-ion battery or battery pack having multiple cells, a battery management system may reduce operation outside of each cell's desired operating area (max-charge, min-charge, safe temperature range, etc.) and to balance cells to reduce state of charge mismatches. Such may improve battery efficiency and increase capacity. As the number of cells and load currents increase, the potential for mismatch between the cells increases. Two kinds of mismatch are state-of-charge (SOC) and capacity/energy ("C/E"). Though SOC is more common, each problem may limit pack charge capacity (mA·h) to that of the weakest cell.

As indicated, the protection and management circuitry associated with a battery cell 1104 and battery pack 1102 may receive the detection signal from the separator conductive layer of an individual battery cell 1104 via a detection interface component of the battery cell 1104. Further, circuitry in the electronic device 1100 (the system housing and using the battery pack 1102) may ultimately receive and process indication of the detection provided by the conductive layer and detection interface component of the cell 1104. The electronic device 1100 may have a processor (e.g., hardware processor, microprocessor, central processing unit or CPU, etc.) and memory (e.g., non-volatile memory) storing code executable by the processor to process indication of the detection, to alert the user, to shutdown charging of the battery pack 1102, and to formulate and implement other responses.

Figure 12:
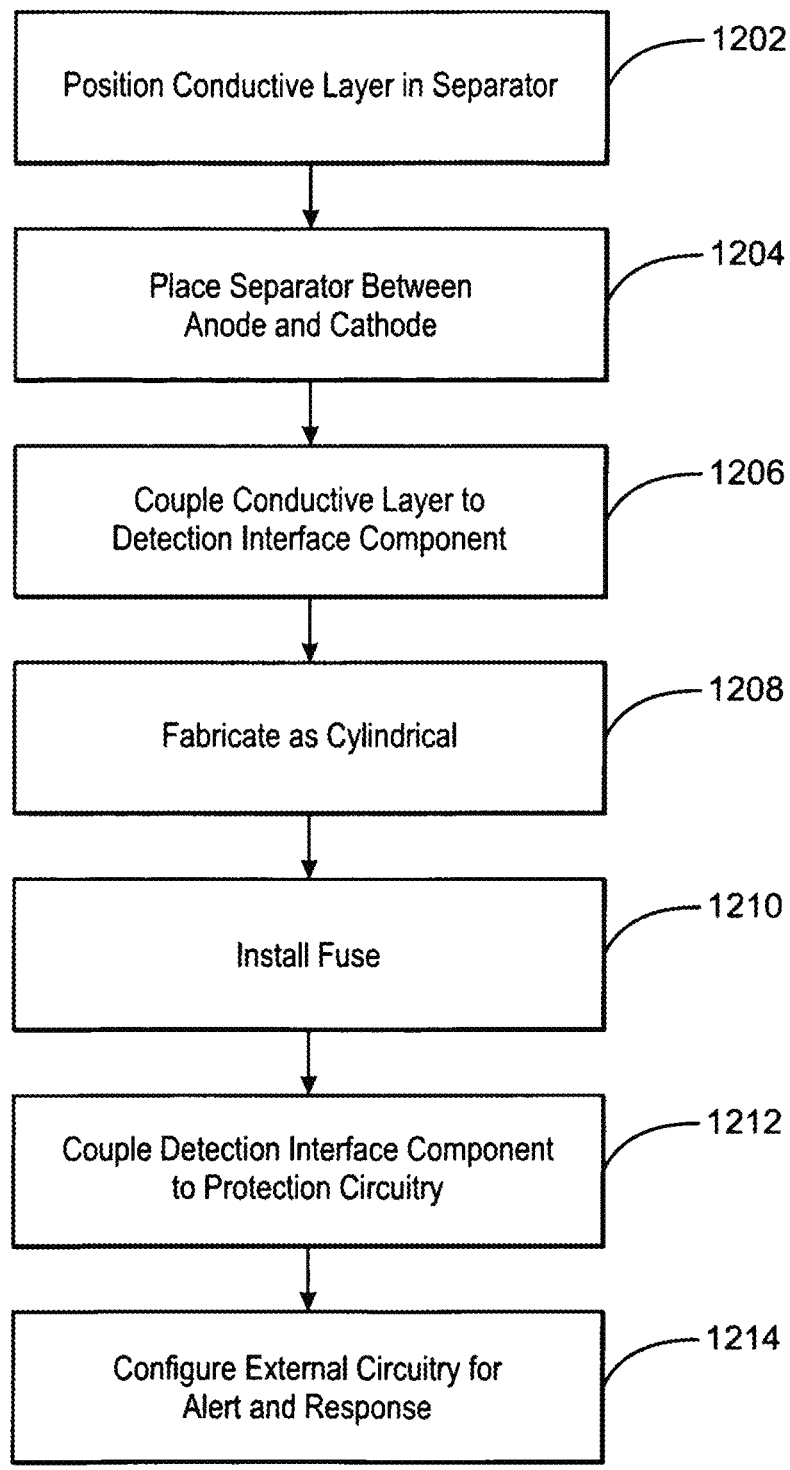
FIG. 12 is a block flow diagram of a method of manufacturing a battery or battery cell in accordance with embodiments of the present techniques.

FIG. 12 is a method 1200 of manufacturing a battery or battery cell. The actions depicted in the various blocks of FIG. 12 are not presented in a particular order, and variations in the order may be implemented. At block 1202, the method includes positioning a conductive layer in the separator. The position of the conductive layer in a separator (e.g., with respect to the width of the separator) may be specified based on factors such as early detection time, battery life, etc. The conductive layer may be position in the separator to provide for detection of dendrite growth from the anode into the separator, and thus the conductive layer facilitates indication of an early warning of a potential piercing by a dendrite of the separator from the anode to active material of the cathode.

At block 1204, the method includes placing the separator between an anode and cathode of the battery. As discussed, a separator is disposed between the anode and the cathode to electrically isolate the anode and cathode from each other, while allowing ions to pass through with the separator being permeable to ions (e.g., lithium ions). The separator may be constructed of an ionically conductive film, or as a porous insulator, facilitating the flow of an ionically-conductive electrolyte through the pores. In some examples, the battery or battery cell is a lithium-metal battery, the anode includes lithium metal, the cathode includes metal oxide, and wherein the dendrite growth is from the anode.

At block 1206, the method includes coupling the conductive layer in the separator to a detection interface component of the battery cell. A direct connection, a wired connection, a wired fused connection, and other connections, may couple the conductive layer to the detection interface component. As discussed herein, various types of detection interface components may be employed or fabricated. In certain examples, the cathode current collector is utilized as the detection interface component. In other examples, a third terminal of the battery cell is fabricated as the detection interface component. In operation, the detection interface component facilitates routing of a detection signal or current from the separator conductive layer to circuitry external to the battery cell.

Thus, as reference by block 1206, the method may include coupling the conductive layer to a detection interface component of the battery cell, the detection interface component configured to couple to protection circuitry external to the battery cell and to provide a signal (e.g., detection signal or detection current) from the conductive layer to the protection circuitry indicative of dendrite growth into the separator during operation of the battery cell. The signal may be indicative of a short circuit between the anode and the conductive layer. As discussed below with respect to block 1210, the coupling of the conductive layer to the detection interface component may include installing a connection wire electrically coupling the conductive layer to the detection interface component forming a conductive path. In some examples, the detection interface component may be a cathode current collector of the cathode. The detection may be prior to the dendrite growth reaching active material of the cathode that would cause a short circuit between the anode and the active material of the cathode. As also mentioned, the installing of the connection wire may include installing a fuse along the connection wire.

Moreover, as referenced by block 1208, the battery cell may be fabricated as a cylindrical battery cell. A cylindrical shape may be advantageous for Li-metal battery cells due to the pressure applied to keep the L-metal growth on the anode in place. In certain embodiment, the method may include fabricating the battery cell as a cylindrical battery cell having three electrodes, wherein a first electrode is the anode having an anode terminal, a second electrode is the cathode having a cathode terminal, and a third electrode is the conductive layer as a detection electrode and with the detection interface component as a third terminal of the battery cell. Thus, in other words, The battery cell may be a cylindrical battery cell and have three terminals electrically isolated with respect to each other, wherein in particular examples, the three terminals are a first cap, a second cap, and a tube of the cylindrical battery cell. In these particular examples, one of these three terminals is the detection interface component coupled to the conductive layer and is a detection terminal. As mentioned, the detection may be before the dendrite growth reaches the cathode resulting in a short circuit between the anode and the cathode.

Further, as alluded above and as indicated by block 1210, a wire connection coupling the separator conductive layer to the detection interface terminal may be installed with a fuse. In operation, the fuse may break or disconnect if a relatively large amount of current flows through the fuse, such as in the event of a significant short circuit between anode, the conducive layer, and the detection interface element, i.e., due to a dendrite reaching the conductive layer from the anode. However, the disconnection by the fuse may take a few milliseconds, giving time to record the associated event before power is lost or removed. Thus, the method may include installing (block 1210) a fuse electrically coupling the separator conductive layer and the detection interface component (e.g., the cathode current collector). A disconnection by the fuse may stop the charge (or discharge) of the battery.

At block 1212, if the battery cell is constructed or joined as part of a battery pack, the detection interface component of the cell may be coupled to protection circuitry of the battery pack. Therefore, in operation, a detection signal may be routed from the cell separator conductive layer via the detection interface component to the protection circuitry. Lastly, at block 1214, the method may include actions outside of the direct fabrication of the battery, such as configuring circuitry external to battery for alerts (to user) and for automatic or prompted responses to the detection of the short circuit between the anode and the detection electrode.

Figure 13:
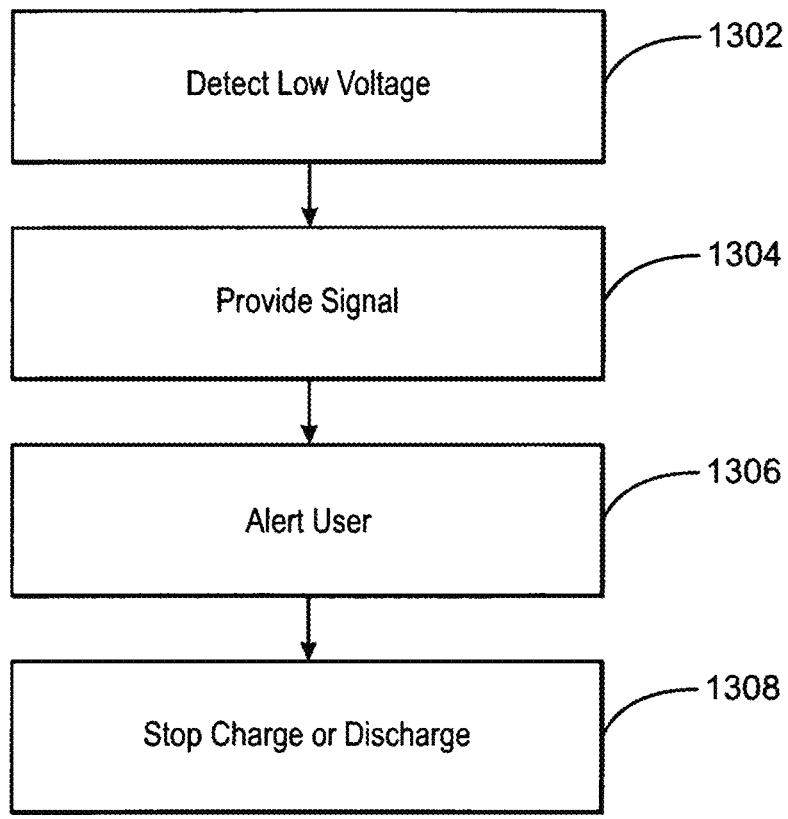
FIG. 13 is a block flow diagram of a method of operating a battery in accordance with embodiments of the present techniques.

FIG. 13 is a method 1300 of operating a battery or an electronic device having the battery. The battery has a battery cell having a detection interface component. At block 1302, the method includes detecting low voltage (e.g., unusually low voltage, unexpectedly low voltage, voltage near zero, or zero voltage) in the battery cell, such as between an anode and a conductive layer in the separator. In general, the low voltage may be detected via a detection system including the conductive layer and the detection interface component. The low voltage may be measured, for example, via a voltmeter. Again, the low voltage may be due to an internal short circuit between the anode and the conductive layer or detection electrode. Such an internal short circuit may be caused by dendrite growth from the anode into the separator having the conductive layer. At block 1304, the method may include providing (e.g., via the detection system and, in particular, via the detection interface component) a signal indicative of the low voltage or short circuit. The signal (e.g., electrical current) may be provided from the conductive layer to a circuit external to the battery cell. At block 1306, the method may include alerting the user of the low voltage or short circuit between the anode and the conductive layer. For example, circuitry external to the battery cell (such as in the battery or battery pack, and/or in the electronic device housing the battery) may receive the signal (provided by the detection system) and process the signal to alert the user. At block 1308, the method may include stopping the charge (or discharge) in response to the signal and detection of the low voltage and any associated short circuit. Other actions in response to the detection or detection signal may be performed.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary. Example 1 is a battery cell configured for a battery, the battery cell. The battery cell configured for a battery, the battery cell includes a first electrode comprising an anode; a second electrode comprising a cathode; a separator disposed between the anode and the cathode; and a conductive layer disposed in the separator to facilitate detection of dendrite growth from the anode into the separator, the detection correlative with a reduction in voltage between the anode and the conductive layer; and a detection interface component coupled to the conductive layer and configured to facilitate routing of a signal from the conductive layer to a circuit external to the battery cell, the signal indicative of the detection.

Example 2 includes the battery cell configured for a battery, the battery cell of example 1, including or excluding optional features. In this example, the battery cell configured for a battery, the battery cell includes a connection coupling the conductive layer to the detection interface component forming a conductive path, wherein the signal comprises electrical current, wherein the detection of dendrite growth comprises detecting a dendrite reaching the conductive layer that results in a short circuit between the anode and the conductive layer, and wherein the detection is correlative with current flow from the anode through conductive layer. Optionally, the connection comprises a wire connection, and wherein the conductive layer is configured to facilitate indication of a breakdown of the dendrite that reached the conductive layer, the breakdown demonstrated by a return of a voltage difference between the anode and the conductive layer indicative that the short circuit has abated.

Example 3 includes the battery cell configured for a battery, the battery cell of any one of examples 1 to 2, including or excluding optional features. In this example, the circuit comprises a protection circuit of the battery, wherein the battery cell comprises a lithium-metal battery cell, the anode comprises lithium metal, and the cathode comprises metal oxide, and wherein the detection of dendrite growth comprises detecting a dendrite as reaching the conductive layer, the detection in response to the dendrite causing a short circuit between the anode and the conductive layer, wherein the detection is prior to the dendrite growth reaching active material of the cathode, and wherein the detection is based on a measured reduction in the voltage or a measured increase in current from the anode through the conductive layer, or both.

Example 4 includes the battery cell configured for a battery, the battery cell of any one of examples 1 to 3, including or excluding optional features. In this example, the detection interface component comprises a cathode current collector of the battery cell and is configured to function both as the cathode current collector and to facilitate the routing of the signal from the conductive layer to the circuit, wherein the detection comprises to detect dendrite growth into the separator before the dendrite growth reaches the cathode that would cause a short circuit between the anode and active material of the cathode, and wherein the battery cell does not comprise more than two terminals. Optionally, the battery cell configured for a battery, the battery cell includes a connection wire coupling the conductive layer to the detection interface component forming a conductive path, wherein the connection wire comprises a fuse configured to disconnect the conductive layer and the cathode current collector in response to a short circuit between the anode and cathode current collector, the disconnect to restore normal operation voltage to a coupled electronic device, the electronic device to provide an error message to a user based on a transitory voltage change detected at the cathode before the fuse disconnected the conductive layer from the cathode current collector.

Example 5 includes the battery cell configured for a battery, the battery cell of any one of examples 1 to 4, including or excluding optional features. In this example, the anode comprises a first terminal of the battery cell; the cathode comprises a second terminal of the battery cell; the detection interface component comprises a third terminal of the battery cell, wherein the first terminal, second terminal, and third terminal are electrically isolated with respect to each other; and the conductive layer comprises a third electrode of the battery cell as a detection electrode.

Example 6 includes the battery cell configured for a battery, the battery cell of any one of examples 1 to 5, including or excluding optional features. In this example, the battery cell is a cylindrical battery cell and comprises three terminals electrically isolated with respect to each other, wherein the three terminals comprise a first cap, a second cap, and a tube of the cylindrical battery cell, and wherein one of the three terminals is the detection interface component coupled to the conductive layer and is a detection terminal.

Example 7 includes the battery cell configured for a battery, the battery cell of any one of examples 1 to 6, including or excluding optional features. In this example, the battery cell comprises a cylindrical battery cell, the detection interface component coupled to the conductive layer comprises a tube terminal of the battery cell, the anode comprises an anode cap terminal of the battery cell, and the cathode comprises a cathode cap terminal of the battery cell.

Example 8 includes the battery cell configured for a battery, the battery cell of any one of examples 1 to 7, including or excluding optional features. In this example, the battery cell configured for a battery, the battery cell includes a detection layer comprising the conductive layer, the detection interface component, and a connection wire coupling the conductive layer to the detection interface component, and wherein the circuit comprises a protection circuit of the battery, wherein a detection system comprises the detection layer and components of the protection circuit, the detection system configured to detect a short circuit between the anode and the conductive layer based on the reduction in voltage between the anode and the conductive layer. Optionally, the detection system is configured to provide a detection signal to an electronic device housing the battery, the detection signal indicative of the short circuit between the anode and the conductive layer, and the detection signal to be processed by the electronic device to alert a user of the electronic device. Optionally, the detection system comprises components of an electronic device housing the battery.

Example 9 is an electronic device. The electronic device includes a battery comprising a battery cell comprising: an anode and a cathode; a separator disposed between the anode and the cathode; a conductive layer disposed in the separator to facilitate detection of dendrite growth from the anode into the separator prior to the dendrite growth reaching the cathode, the detection correlative with a reduction in voltage between the anode and the conductive layer; and a detection interface component coupled to the conductive layer to facilitate routing of a signal indicative of the detection from the conductive layer to a circuit external to the battery cell.

Example 10 includes the electronic device of example 9, including or excluding optional features. In this example, the electronic device includes a connection coupling the conductive layer to the detection interface component forming a conductive path, wherein the circuit compromises protection circuitry of the battery, wherein the battery is a battery pack, wherein the signal comprises electrical current, and wherein the electronic device is configured to alert a user in response to the detection. Optionally, the battery cell comprises a lithium-metal battery cell, the anode comprises lithium metal, and the cathode comprises metal oxide, and wherein the connection comprise a connection wire comprising a fuse.

Example 11 includes the electronic device of any one of examples 9 to 10, including or excluding optional features. In this example, the detection interface component comprises a cathode current collector of the cathode, wherein the detection comprises to detect dendrite growth into the separator before the dendrite growth reaches active material of the cathode that would cause a short circuit between the anode and the active material of the cathode, wherein the active material does not comprise the cathode current collector. Optionally, the battery cell is a cylindrical battery cell, the anode comprises an anode can terminal, and the cathode comprises a cathode cap terminal.

Example 12 includes the electronic device of any one of examples 9 to 11, including or excluding optional features. In this example, the anode comprises a first terminal of the battery cell; the cathode comprises a second terminal of the battery cell; the detection interface component comprises a third terminal of the battery cell and is not a cathode current collector; the conductive layer comprises a third electrode of the battery cell as a detection electrode.

Example 13 includes the electronic device of any one of examples 9 to 12, including or excluding optional features. In this example, the battery cell is a cylindrical battery cell and comprises three terminals electrically isolated with respect to each other, wherein the three terminals comprise a first cap, a second cap, and a tube casing of the cylindrical battery cell, and wherein one of the three terminals is the detection interface component coupled to the conductive layer and is a detection terminal.

Example 14 is a method of manufacturing a battery cell. The method includes positioning a conductive layer in a separator; placing the separator between an anode of the battery cell and a cathode of the battery cell; and coupling the conductive layer to a detection interface component of the battery cell, the detection interface component configured to couple to protection circuitry external to the battery cell and to provide a signal from the conductive layer to the protection circuitry indicative of dendrite growth into the separator during operation of the battery cell.

Example 15 includes the method of example 14, including or excluding optional features. In this example, the battery cell comprises a lithium-metal battery cell, the anode comprises lithium metal, and the cathode comprises metal oxide, and wherein the dendrite growth during operation is from the anode, wherein the signal is indicative of a short circuit between the anode and the conductive layer. Optionally, coupling the conductive layer to the detection interface component comprises installing a connection wire electrically coupling the conductive layer to the detection interface component forming a conductive path, wherein the signal comprises electrical current. Optionally, the detection interface component comprises a cathode current collector of the cathode, wherein the detection is prior to the dendrite growth reaching active material of the cathode and causing a short circuit between the anode and the active material of the cathode, and wherein installing the connection wire comprises installing a fuse along the connection wire.

Example 16 includes the method of any one of examples 14 to 15, including or excluding optional features. In this example, the method includes fabricating the battery cell as a cylindrical battery cell having three electrodes, wherein a first electrode comprises the anode comprising an anode terminal, a second electrode comprises the cathode comprising a cathode terminal, and a third electrode comprises the conductive layer as a detection electrode and the detection interface component as a third terminal.

Example 17 includes the method of any one of examples 14 to 16, including or excluding optional features. In this example, the battery cell is a cylindrical battery cell and comprises three terminals electrically isolated with respect to each other, wherein the three terminals comprise a first cap, a second cap, and a tube of the cylindrical battery cell, wherein one of the three terminals is the detection interface component coupled to the conductive layer and is a detection terminal, and wherein the detection is before the dendrite growth reaches the cathode resulting in a short circuit between the anode and the cathode.

Example 18 is a battery cell configured for a battery, the battery cell. The battery cell configured for a battery, the battery cell includes a first electrode comprising an anode; a second electrode comprising a cathode; a separator disposed between the anode and the cathode; and a conductive layer disposed in the separator to facilitate detection of dendrite growth from the anode into the separator, the detection correlative with a reduction in voltage between the anode and the conductive layer; and a detection interface component coupled to the conductive layer and configured to facilitate routing of a signal from the conductive layer to a circuit external to the battery cell, the signal indicative of the detection.

Example 19 includes the battery cell configured for a battery, the battery cell of example 18, including or excluding optional features. In this example, the battery cell configured for a battery, the battery cell includes a connection coupling the conductive layer to the detection interface component forming a conductive path, wherein the signal comprises electrical current, wherein the detection of dendrite growth comprises detecting a dendrite reaching the conductive layer that results in a short circuit between the anode and the conductive layer, and wherein the detection is correlative with current flow from the anode through conductive layer.

Example 20 includes the battery cell configured for a battery, the battery cell of any one of examples 18 to 19, including or excluding optional features. In this example, the circuit comprises a protection circuit of the battery, wherein the battery cell comprises a lithium-metal battery cell, the anode comprises lithium metal, and the cathode comprises metal oxide, and wherein the detection of dendrite growth comprises detecting a dendrite as reaching the conductive layer, the detection in response to the dendrite causing a short circuit between the anode and the conductive layer, wherein the detection is prior to the dendrite growth reaching active material of the cathode, and wherein the detection is based on a measured reduction in the voltage or a measured increase in current from the anode through the conductive layer, or both.

Example 21 includes the battery cell configured for a battery, the battery cell of any one of examples 18 to 20, including or excluding optional features. In this example, the detection interface component comprises a cathode current collector of the battery cell and is configured to function both as the cathode current collector and to facilitate the routing of the signal from the conductive layer to the circuit, wherein the detection comprises to detect dendrite growth into the separator before the dendrite growth reaches the cathode that would cause a short circuit between the anode and active material of the cathode, and wherein the battery cell does not comprise more than two terminals. Optionally, the battery cell configured for a battery, the battery cell includes a connection wire coupling the conductive layer to the detection interface component forming a conductive path, wherein the connection wire comprises a fuse configured to disconnect the conductive layer and the cathode current collector in response to a short circuit between the anode and cathode current collector, the disconnect to restore normal operation voltage to a coupled electronic device, the electronic device to alert a user based on a transitory voltage change detected at the cathode before the fuse disconnected the conductive layer from the cathode current collector.

Example 22 includes the battery cell configured for a battery, the battery cell of any one of examples 18 to 21, including or excluding optional features. In this example, the anode comprises a first terminal of the battery cell; the cathode comprises a second terminal of the battery cell; the detection interface component comprises a third terminal of the battery cell, wherein the first terminal, second terminal, and third terminal are electrically isolated with respect to each other; and the conductive layer comprises a third electrode of the battery cell as a detection electrode.

Example 23 includes the battery cell configured for a battery, the battery cell of any one of examples 18 to 22, including or excluding optional features. In this example, the battery cell is a cylindrical battery cell and comprises three terminals electrically isolated with respect to each other, wherein the three terminals comprise a first cap, a second cap, and a tube of the cylindrical battery cell, and wherein one of the three terminals is the detection interface component coupled to the conductive layer and is a detection terminal.

Example 24 is an electronic device. The electronic device includes a battery comprising a battery cell comprising: an anode and a cathode; a separator disposed between the anode and the cathode; a conductive layer disposed in the separator to facilitate detection of dendrite growth from the anode into the separator prior to the dendrite growth reaching the cathode, the detection correlative with a reduction in voltage between the anode and the conductive layer; a detection interface component coupled to the conductive layer to facilitate routing of a signal indicative of the detection from the conductive layer to a circuit external to the battery cell; and a connection coupling the conductive layer to the detection interface component forming a conductive path, wherein the circuit compromises protection circuitry of the battery.

Example 25 includes the electronic device of example 24, including or excluding optional features. In this example, the battery cell comprises a lithium-metal battery cell, the anode comprises lithium metal, and the cathode comprises metal oxide, and wherein the connection comprise a connection wire comprising a fuse, wherein the signal comprises electrical current, and wherein the electronic device is configured to alert a user in response to the detection.

Example 26 includes the electronic device of any one of examples 24 to 25, including or excluding optional features. In this example, the detection interface component comprises a cathode current collector of the cathode, wherein the detection comprises to detect dendrite growth into the separator before the dendrite growth reaches active material of the cathode that would cause a short circuit between the anode and the active material of the cathode, wherein the active material does not comprise the cathode current collector, wherein the battery cell is a cylindrical battery cell, the anode comprises an anode can terminal, and the cathode comprises a cathode cap terminal.

Example 27 includes the electronic device of any one of examples 24 to 26, including or excluding optional features. In this example, the battery cell is a cylindrical battery cell and comprises three terminals electrically isolated with respect to each other, wherein the three terminals comprise a first cap, a second cap, and a tube casing of the cylindrical battery cell, and wherein one of the three terminals is the detection interface component coupled to the conductive layer and is a detection terminal.

Example 28 is a method of manufacturing a battery cell. The method includes positioning a conductive layer in a separator; placing the separator between an anode of the battery cell and a cathode of the battery cell; and coupling the conductive layer to a detection interface component of the battery cell, the detection interface component configured to couple to protection circuitry external to the battery cell and to provide a signal from the conductive layer to the protection circuitry indicative of dendrite growth, the dendrite growth from the anode into the separator during operation of the battery cell, the signal indicative of a short circuit between the anode and the conductive layer, wherein the battery cell comprises a lithium-metal battery cell, the anode comprises lithium metal, and the cathode comprises metal oxide.

Example 29 includes the method of example 28, including or excluding optional features. In this example, coupling the conductive layer to the detection interface component comprises installing a connection wire electrically coupling the conductive layer to the detection interface component forming a conductive path, wherein the signal comprises electrical current.

Example 30 includes the method of any one of examples 28 to 29, including or excluding optional features. In this example, the detection interface component comprises a cathode current collector of the cathode, wherein the detection is prior to the dendrite growth reaching active material of the cathode and causing a short circuit between the anode and the active material of the cathode, and wherein installing the connection wire comprises installing a fuse along the connection wire.

Example 31 includes the method of any one of examples 28 to 30, including or excluding optional features. In this example, the method includes fabricating the battery cell as a cylindrical battery cell having three electrodes and three terminals, the three terminals electrically isolated with respect to each other and comprising a first cap, a second cap, and a tube of the cylindrical battery cell, wherein one of the three terminals is the detection interface component coupled to the conductive layer and is a detection terminal, wherein the detection is before the dendrite growth reaches the cathode that would result in a short circuit between the anode and the cathode, and wherein a third electrode comprises the conductive layer as a detection electrode.

Example 32 is a battery cell configured for a battery, the battery cell. The battery cell configured for a battery, the battery cell includes a first electrode comprising an anode; a second electrode comprising a cathode; a separator disposed between the anode and the cathode; a conductive layer disposed in the separator to facilitate detection of dendrite growth from the anode into the separator, the detection correlative with a reduction in voltage between the anode and the conductive layer; and a terminal coupled to the conductive layer to facilitate routing of a signal from the conductive layer to a circuit external to the battery cell, the signal indicative of the detection.

Example 33 includes the battery cell configured for a battery, the battery cell of example 32, including or excluding optional features. In this example, the terminal is a detection interface of the battery cell.

Example 34 includes the battery cell configured for a battery, the battery cell of any one of examples 32 to 33, including or excluding optional features. In this example, the circuit comprises a protection circuit of the battery, wherein the battery cell comprises a lithium-metal battery cell, the anode comprises lithium metal, and the cathode comprises metal oxide, and wherein the detection of dendrite growth comprises detecting a dendrite as reaching the conductive layer, the detection in response to the dendrite causing a short circuit between the anode and the conductive layer, wherein the detection is prior to the dendrite growth reaching active material of the cathode, and wherein the detection is based on a measured reduction in the voltage or a measured increase in current from the anode through the conductive layer, or both.

Example 35 includes the battery cell configured for a battery, the battery cell of any one of examples 32 to 34, including or excluding optional features. In this example, the signal comprises electrical current, wherein the terminal comprises an electrically conductive path between the conductive layer and the circuit, wherein the detection of dendrite growth comprises detecting a dendrite reaching the conductive layer that results in a short circuit between the anode and the conductive layer, wherein the detection is correlative with increased current flow through the conductive path, and wherein the conductive layer and the terminal are further configured to facilitate indication of a breakdown of the dendrite that reached the conductive layer, the breakdown demonstrated by a return of a voltage difference between the anode and the conductive layer indicative that the short circuit has abated.

Example 36 includes the battery cell configured for a battery, the battery cell of any one of examples 32 to 35, including or excluding optional features. In this example, the terminal comprises a cathode current collector of the battery cell, the terminal further comprising a connection wire coupling the conductive layer to the cathode current detector, wherein the terminal is configured to function as the cathode current collector and a detection terminal that facilitates the routing of the signal from the conductive layer to the circuit, wherein the detection comprises to detect dendrite growth into the separator before the dendrite growth reaches the cathode that would cause a short circuit between the anode and active material of the cathode, wherein the battery cell comprises a second terminal comprising an anode terminal, wherein the second terminal is not a detection terminal, and wherein the battery cell does not comprise more than two terminals.

Example 37 includes the battery cell configured for a battery, the battery cell of any one of examples 32 to 36, including or excluding optional features. In this example, the terminal comprises a cathode current collector and a cathode terminal of the battery cell, the terminal further comprising a connection wire coupling the conductive layer to the cathode current detector, wherein the terminal is configured to function as the cathode current collector, the cathode terminal, and a detection terminal that facilitates the routing of the signal from the conductive layer to the circuit, wherein the detection comprises to detect dendrite growth into the separator before the dendrite growth reaches the cathode that would cause a short circuit between the anode and active material of the cathode, wherein the battery cell comprises a second terminal comprising an anode terminal, wherein the second terminal is not a detection terminal, and wherein the battery cell does not comprise more than two terminals.

Example 38 includes the battery cell configured for a battery, the battery cell of any one of examples 32 to 37, including or excluding optional features. In this example, the terminal coupled to the conductive layer comprises a connection wire coupling the conductive layer to the cathode current detector, wherein the battery cell comprises a first terminal and a second terminal, wherein: the first terminal comprises the terminal coupled to the conductive layer, the first terminal comprising a cathode current collector of the battery cell and to function both as the cathode current collector and a detection terminal that facilitates the routing of the signal from the conductive layer to the circuit; and the second terminal comprises an anode terminal and is not a detection terminal, wherein the battery cell does not comprise a third terminal.

Example 39 includes the battery cell configured for a battery, the battery cell of any one of examples 32 to 38, including or excluding optional features. In this example, the terminal comprises a cathode current collector and a cathode cap terminal associated with the cathode, the terminal further comprising a connection wire electrically coupling the conductive layer to the cathode current collector forming a conductive path, the connection wire comprising a fuse, wherein the battery cell is a cylindrical battery cell having only two terminals, the two terminals including the terminal coupled to the conductive layer and a second terminal comprising a can terminal associated with the anode.

Example 40 includes the battery cell configured for a battery, the battery cell of any one of examples 32 to 39, including or excluding optional features. In this example, the terminal comprises a third terminal of the battery cell and is not a cathode current collector; the anode comprises a first terminal of the battery cell; the cathode comprises a second terminal of the battery cell; and the conductive layer comprises a third electrode of the battery cell as a detection electrode.

Example 41 includes the battery cell configured for a battery, the battery cell of any one of examples 32 to 40, including or excluding optional features. In this example, the battery cell is a cylindrical battery cell and comprises three terminals electrically isolated with respect to each other, wherein the three terminals comprise a first cap, a second cap, and a tube of the cylindrical battery cell, and wherein one of the three terminals is the terminal coupled to the conductive layer and is a detection terminal.

Example 42 includes the battery cell configured for a battery, the battery cell of any one of examples 32 to 41, including or excluding optional features. In this example, the battery cell comprises a cylindrical battery cell, the terminal coupled to the conductive layer comprises a tube terminal of the battery cell, the anode comprises an anode cap terminal of the battery cell, and the cathode comprises a cathode cap terminal of the battery cell.

Example 43 includes the battery cell configured for a battery, the battery cell of any one of examples 32 to 42, including or excluding optional features. In this example, the battery cell configured for a battery, the battery cell includes a detection layer comprising the conductive layer and the terminal, wherein the circuit comprises a protection circuit of the battery, wherein a detection system comprises the detection layer and components of the protection circuit, the detection system configured to detect a short circuit between the anode and the conductive layer based on the reduction in voltage between the anode and the conductive layer.

Example 44 includes the battery cell configured for a battery, the battery cell of any one of examples 32 to 43, including or excluding optional features. In this example, the detection system is configured to provide a detection signal to an electronic device housing the battery, the detection signal indicative of the short circuit between the anode and the conductive layer, and the detection signal to be processed by the electronic device to alert a user of the electronic device.

Example 45 is an electronic device. The electronic device includes a battery comprising a battery cell comprising: an anode and a cathode; a separator disposed between the anode and the cathode; a conductive layer disposed in the separator to facilitate detection of dendrite growth from the anode into the separator prior to the dendrite growth reaching the cathode, the detection correlative with a reduction in voltage between the anode and the conductive layer; and a terminal coupled to the conductive layer to facilitate routing of a signal indicative of the detection from the conductive layer to a circuit external to the battery cell.

Example 46 includes the electronic device of example 45, including or excluding optional features. In this example, the electronic device includes a connection wire coupling the conductive layer to the terminal forming a conductive path, wherein the circuit compromises protection circuitry of the battery, wherein the battery is a battery pack, wherein the signal comprises electrical current, and wherein the electronic device is configured to alert a user in response to the detection.

Example 47 includes the electronic device of any one of examples 45 to 46, including or excluding optional features. In this example, the terminal comprises a detection interface component of the battery cell.

Example 48 includes the electronic device of any one of examples 45 to 47, including or excluding optional features. In this example, the battery cell comprises a lithium-metal battery cell, the anode comprises lithium metal, and the cathode comprises metal oxide, and wherein the connection wire comprises a fuse.

Example 49 includes the electronic device of any one of examples 45 to 48, including or excluding optional features. In this example, the terminal comprises a cathode current collector of the battery cell, wherein the battery cell comprises an anode terminal, and wherein the detection comprises to detect dendrite growth into the separator before the dendrite growth reaches active material of the cathode and causing a short circuit between the anode and the active material of the cathode, wherein the active material does not comprise the cathode current collector. Optionally, the battery cell is a cylindrical battery cell, the anode terminal is an anode can terminal, and a cathode terminal of the battery cell is a cathode cap terminal.

Example 50 includes the electronic device of any one of examples 45 to 49, including or excluding optional features. In this example, the terminal comprises a third terminal of the battery cell and is not a cathode current collector, wherein the anode comprises a first terminal of the battery cell, the cathode comprises a second terminal of the battery cell, and the conductive layer comprises a third electrode of the battery cell as a detection electrode.

Example 51 includes the electronic device of any one of examples 45 to 50, including or excluding optional features. In this example, the battery cell is a cylindrical battery cell and comprises three terminals electrically isolated with respect to each other, wherein the three terminals comprise a first cap, a second cap, and a tube casing of the cylindrical battery cell, and wherein one of the three terminals is the terminal coupled to the conductive layer and is a detection terminal.

Example 52 is a method of manufacturing a battery cell. The method includes positioning a conductive layer in a separator; placing the separator between an anode of the battery cell and a cathode of the battery cell; and coupling the conductive layer to a terminal of the battery cell, the terminal configured to couple to protection circuitry external to the battery cell and to provide a signal from the conductive layer to the protection circuitry indicative of dendrite growth into the separator during operation of the battery cell.

Example 53 includes the method of example 52, including or excluding optional features. In this example, the battery cell comprises a lithium-metal battery cell, the anode comprises lithium metal, and the cathode comprises metal oxide, and wherein the dendrite growth during operation is from the anode, wherein the signal is indicative of a short circuit between the anode and the conductive layer.

Example 54 includes the method of any one of examples 52 to 53, including or excluding optional features. In this example, the terminal comprises a detection interface.

Example 55 includes the method of any one of examples 52 to 54, including or excluding optional features. In this example, coupling the conductive layer to the terminal comprises installing a connection wire electrically coupling the conductive layer to the terminal forming a conductive path, wherein the signal comprises electrical current.

Example 56 includes the method of any one of examples 52 to 55, including or excluding optional features. In this example, the terminal comprises a cathode current collector of the cathode, and wherein the detection is prior to the dendrite growth reaching active material of the cathode and causing a short circuit between the anode and the active material of the cathode, and wherein installing the connection wire comprises installing a fuse along the connection wire.

Example 57 includes the method of any one of examples 52 to 56, including or excluding optional features. In this example, the method includes fabricating the battery cell as a cylindrical battery cell having three electrodes associated with three terminals, the three terminals electrically isolated with respect to each other, wherein a first electrode comprises the anode and an associated first terminal comprises an anode terminal, a second electrode comprises the cathode and an associated second terminal comprises a cathode terminal, and a third electrode comprises the conductive layer as a detection electrode and an associated third terminal comprises the terminal coupled to the conductive layer.

Example 58 includes the method of any one of examples 52 to 57, including or excluding optional features. In this example, the battery cell is a cylindrical battery cell and comprises three terminals electrically isolated with respect to each other, wherein the three terminals comprise a first cap, a second cap, and a tube of the cylindrical battery cell, wherein one of the three terminals is the terminal coupled to the conductive layer and is a detection terminal, and wherein the detection is before the dendrite growth reaches the cathode resulting in a short circuit between the anode and the cathode.

Example 59 is a method of operating a battery having a battery cell. The method includes detecting low voltage between an anode and a conductive layer of the battery cell, the conductive layer disposed in a separator between the anode and a cathode of the battery cell; and providing a signal indicative of the low voltage to a circuit external to the battery cell.

Example 60 includes the method of example 59, including or excluding optional features. In this example, the low voltage comprises a short circuit between the anode and the conductive layer.

Example 61 includes the method of any one of examples 59 to 60, including or excluding optional features. In this example, the method includes alerting, via the circuit, a user of the low voltage.

Example 62 includes the method of any one of examples 59 to 61, including or excluding optional features. In this example, the method includes stopping a charge of the battery cell in response to the signal.

Example 63 includes the method of any one of examples 59 to 62, including or excluding optional features. In this example, the method includes stopping a discharge of the battery cell in response to the signal.

Example 64 includes the method of any one of examples 59 to 63, including or excluding optional features. In this example, providing the signal comprises providing the signal via a detection interface component of the battery cell.

Example 65 includes the method of any one of examples 59 to 64, including or excluding optional features. In this example, the signal comprises electrical current.

Example 66 is a system for operating a battery having a battery cell. The system includes means for detecting low voltage between an anode and a conductive layer of the battery cell, the conductive layer disposed in a separator between the anode and a cathode of the battery cell; means for providing a signal indicative of the low voltage to a circuit external to the battery cell.

Example 67 includes the system of example 66, including or excluding optional features. In this example, the low voltage comprises a short circuit between the anode and the conductive layer.

Example 68 includes the system of any one of examples 66 to 67, including or excluding optional features. In this example, the system includes means for alerting a user of the low voltage.

Example 69 includes the system of any one of examples 66 to 68, including or excluding optional features. In this example, the system includes means for stopping a charge of the battery cell in response to the signal.

Example 70 includes the system of any one of examples 66 to 69, including or excluding optional features. In this example, the signal comprises electrical current.

Example 71 is a battery. The battery includes three electrodes comprising an anode, a cathode, and a detection electrode; a separator disposed between the anode and the cathode; and a detection system comprising the detection electrode and configured to detect dendrite growth into the separator before a short circuit is realized between the anode and the cathode.

Example 72 includes the battery of example 71, including or excluding optional features. In this example, the battery comprises a lithium-metal battery, the anode comprises lithium metal, and the cathode comprises metal oxide, and wherein the dendrite growth is from the anode.

Example 73 includes the battery of any one of examples 71 to 72, including or excluding optional features. In this example, the detection system comprises a detection interface of the battery cell, the detection interface configured to route a signal indicative of the dendrite growth to a circuit external to the battery cell. Optionally, the detection system comprises components of the circuit.

Example 74 includes the battery of any one of examples 71 to 73, including or excluding optional features. In this example, the detection system is configured to provide a signal indicative of a short circuit between the anode and the detection electrode, the signal to be processed by external circuitry to alert a user. Optionally, the detection system comprises components of the external circuitry.

Example 75 includes the battery of any one of examples 71 to 74, including or excluding optional features. In this example, the detection electrode comprises a conductive layer positioned in the separator, and wherein the detection system is configured to detect a short circuit between the anode and the conductive layer.

Example 76 includes the battery of any one of examples 71 to 75, including or excluding optional features. In this example, the battery cell comprises a cylindrical battery cell, the anode comprises an anode cap terminal of the battery cell, the cathode comprises a cathode cap terminal of the battery cell, and the detection electrode comprises a can terminal of the battery cell.

Example 77 includes the battery of any one of examples 71 to 76, including or excluding optional features. In this example, the detection system comprises components of an electronic device housing the battery.

Example 78 includes the battery of any one of examples 71 to 77, including or excluding optional features. In this example, the battery is a battery pack configured for use by an electronic device.

Example 79 is a method of manufacturing a battery cell. The method includes placing a separator between an anode and cathode of the battery cell; positioning a conductive layer in the separator; and disposing a detection system configured to detect dendrite growth into the separator before a short circuit is realized between the anode and the cathode of the battery cell, and wherein the detection system comprises a detection interface coupled to the conductive layer.

Example 80 includes the method of example 79, including or excluding optional features. In this example, the method includes configuring the detection system to detect a short circuit between the anode and the conductive layer.

Example 81 includes the method of any one of examples 79 to 80, including or excluding optional features. In this example, the method includes configuring the detection system to provide a signal indicative of a short circuit between the anode and the conductive layer, the signal to be processed by external circuitry to alert a user.

Example 82 includes the method of any one of examples 79 to 81, including or excluding optional features. In this example, the method includes electrically connecting the conductive layer and a cathode current collector of the battery cell Example 83 includes the method of any one of examples 79 to 82, including or excluding optional features. In this example, the method includes installing a fuse electrically coupling the conductive layer and a cathode current collector of the battery cell Example 84 includes the method of any one of examples 79 to 83, including or excluding optional features. In this example, the method includes fabricating the battery cell as a cylindrical battery cell comprising: the anode having an anode cap terminal of the battery cell; the cathode having a cathode cap terminal of the battery cell; and the conductive layer as a detection electrode comprising a can terminal of the battery cell, wherein the detection interface comprises the can terminal.

Example 85 includes the method of any one of examples 79 to 84, including or excluding optional features. In this example, the method includes fabricating the battery cell as a cylindrical battery cell comprising: the cathode comprising a cathode cap terminal of the battery cell; the anode comprising an anode can terminal of the battery cell; and the conductive layer coupled to a cathode current collector of the battery cell, the cathode current collector as the detection interface of the battery cell.

Example 86 includes the method of any one of examples 79 to 85, including or excluding optional features. In this example, the battery cell comprises a lithium-metal battery cell, the anode comprises lithium metal, and the cathode comprises metal oxide, and wherein the dendrite growth is from the anode.

Example 87 includes the method of any one of examples 79 to 86, including or excluding optional features. In this example, the battery cell comprises three electrodes comprising the anode, the cathode, and the conductive layer as a detection electrode.

It is to be understood that specifics in the aforementioned examples may be used anywhere in one or more embodiments. For instance, all optional features of the computing device described above may also be implemented with respect to either of the methods described herein or a computer-readable medium.

Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A battery module comprising:
a cathode comprising a cathode active material;
an anode comprising an anode active material;
a separator disposed between the anode and the cathode;
a conductive layer disposed in the separator to facilitate detection of dendrite growth from the anode into the separator;
a battery cell case conductively coupled to the anode and forming a negative electrode of the battery module;
a cathode current collector conductively coupled to the cathode and forming a positive electrode of the battery module;
a conductor to conductively couple the conductive layer disposed in the separator to the cathode current collector and bypass the cathode comprising the cathode active material; and
a protection circuit conductively coupled to the positive electrode and the negative electrode and configured to receive a signal from the conductive layer through the cathode current collector, the signal indicative of a detection of a dendrite growth causing a conductive path between the anode and the conductive layer disposed in the separator.

2. The battery module of claim 1, comprising a transistor coupled in series between the anode and a negative terminal of the battery module and controlled by the protection circuit, wherein upon the detection of the dendrite growth the protection circuit causes the transistor to open to stop charge or discharge of the battery module.

3. The battery module of claim 1, wherein the conductor to conductively couple the conductive layer disposed in the separator to the cathode current collector comprises a fuse to disconnect the conductive layer and the cathode current collector if the dendrite growth causes a short circuit between the anode and the cathode through the conductor.

4. The battery module of claim 1, wherein the protection circuit comprises an integrated circuit powered by the battery module.

5. The battery module of claim 1, wherein in response to detection of the dendrite growth, the protection circuit sends an alert to an electronic device relying on the battery module for power.

6. An electronic device comprising:
   a battery comprising:
      a cathode comprising a cathode active material;
      an anode comprising an anode active material;
      a separator disposed between the anode and the cathode;
      a conductive layer disposed in the separator to facilitate detection of dendrite growth from the anode into the separator;
      a cathode current collector conductively coupled to the cathode; and
      a conductor to conductively couple the conductive layer disposed in the separator to the cathode current collector and bypassing the cathode active material; and
   a protection circuit conductively coupled to the cathode current collector and the anode and configured to receive a signal from the conductive layer through the cathode current collector, the signal indicative of a detection of a dendrite growth causing a conductive path between the anode and the conductive layer disposed in the separator.

7. The electronic device of claim 6, comprising a transistor coupled in series between the anode and a negative terminal of the battery and controlled by the protection circuit, wherein upon the detection of the dendrite growth the protection circuit causes the transistor to open to stop charge or discharge of the battery.

8. The electronic device of claim 6, wherein the conductor comprises a fuse to disconnect the conductive layer and the cathode current collector if the dendrite growth causes a short circuit between the anode and the cathode through the conductor.

9. The electronic device of claim 6, wherein the protection circuit comprises an integrated circuit powered by the battery.

10. The electronic device of claim 6, wherein in response to detection of the dendrite growth, the electronic device receives an alert signal from the protection circuit.

11. The electronic device of claim 6, wherein the anode comprises lithium metal and the cathode comprises metal oxide.

* * * * *